United States Patent
Chiang et al.

(10) Patent No.: US 7,483,826 B2
(45) Date of Patent: Jan. 27, 2009

(54) GROUP-BASED BCU METHODS FOR ON-LINE DYNAMICAL SECURITY ASSESSMENTS AND ENERGY MARGIN CALCULATIONS OF PRACTICAL POWER SYSTEMS

(75) Inventors: Hsiao-Dong Chiang, Ithaca, NY (US); Hua Li, Ithaca, NY (US); Yasuyuki Tada, Tokyo (JP); Tsuyoshi Takazawa, Tokyo (JP); Takeshi Yamada, Tokyo (JP); Atsushi Kurita, Tokyo (JP); Kaoru Koyanagi, Tokyo (JP)

(73) Assignees: The Tokyo Electric Power Company, Incorporated, Tokyo (JP); Bigwood Systems, Incorporated, Ithaca, NY (US)

(*) Notice: Subject to any disclaimer, the term of this patent is extended or adjusted under 35 U.S.C. 154(b) by 475 days.

(21) Appl. No.: 11/052,800

(22) Filed: Feb. 9, 2005

(65) Prior Publication Data

US 2006/0190227 A1    Aug. 24, 2006

(51) Int. Cl.
*G05F 1/70* (2006.01)
*G05F 3/00* (2006.01)
*G05F 5/00* (2006.01)
*G06F 17/50* (2006.01)
*G06G 7/54* (2006.01)

(52) U.S. Cl. ........................ 703/18; 323/205

(58) Field of Classification Search .................... 703/18
See application file for complete search history.

(56) References Cited

U.S. PATENT DOCUMENTS

| 5,483,462 | A | 1/1996 | Chiang |
| 5,719,787 | A | 2/1998 | Chiang et al. |
| 2003/0200010 | A1* | 10/2003 | Chiang et al. ............... 700/286 |

OTHER PUBLICATIONS

Hsiao-Dong Chiang, et al., "Foundations of Direct Methods for Power System Transient Stability Analysis", IEEE Transactions on Circuits and Systems, vol. cas-34, No. 2, Feb. 1987, pp. 160-173.

* cited by examiner

*Primary Examiner*—Joseph P Hirl
*Assistant Examiner*—Ben M Rifkin
(74) *Attorney, Agent, or Firm*—Oblon, Spivak, McClelland, Maier & Neustadt, P.C.

(57) ABSTRACT

This invention relates to a method of determining stability of unstable equilibrium point (UEP) computed by using BCU method, comprising selecting UEP computed by using BCU method, obtaining a test vector $X^{test}$ for the selected UEP, say $X^{UEP}$ using the following equation:

$$X^{test} = X_s^{post} + 0.99(X^{UEP} - X_s^{post})$$

where $X_s^{post}$ is the SEP, and checking boundary condition of $X^{UEP}$ by simulating system trajectory of post-fault original system starting from $X^{test}$.

3 Claims, 5 Drawing Sheets

GROUP-BASED BCU METHODS FOR ON-LINE DYNAMICAL SECURITY ASSESSMENTS AND ENERGY MARGIN CALCULATIONS OF PRACTICAL POWER SYSTEMS

BACKGROUND OF THE INVENTION

1. Field of the Invention

The invention relates to the field of electrical power systems, and more particularly to methods for on-line transient stability analysis, on-line dynamic security assessments and energy margin calculations of practical power systems.

2. Description of the Related Art

By nature, power systems are continually experiencing disturbances which may cause power system instability. These disturbances can be classified as either event disturbances or demand disturbances. Event disturbance can be a short-circuit fault, or the loss of a generator, load or transmission line facility, or a combination of the above. Demand disturbance can be load variations at a set of buses, or power transfer between two sets of specified buses, or a combination of these two. Several recent power system blackouts due to disturbances have occurred in several countries, including Belgium, Canada, France, Japan, Sweden and the United States. Modern energy management systems typically do not perform on-line dynamic security assessment (DSA) to ensure the ability of the power system to withstand certain credible contingencies (disturbances). As our society is increasingly dependent on reliable electricity supply and blackouts are becoming more costly when they occur, any violation of stability limits can have huge impacts (financially and physically) on society. Especially in the era of de-regulation, on-line DSA is an important tool that is needed to avoid any potential blackout.

Power systems must be planned and operated to withstand the occurrence of certain credible disturbances. At present, modern energy management systems (EMS) only perform the task of on-line static security assessment but not the task of on-line dynamic security assessment. Hence, modern EMS still can not assess the ability of a power system to withstand credible contingencies (disturbances.) The set of credible contingencies is a collection of disturbances that are likely to occur with potentially serious consequences. The extension of EMS to include on-line dynamic security assessment (DSA) is desirable and is becoming a necessity for modern power systems. This extension is, however, a rather challenging task; despite the consistent pressure for such an extension, partly due to economic incentives and partly due to environmental concerns, performing DSA has long remained an off-line activity. Indeed, from a computational viewpoint, on-line static security assessment needs to solve a large set of non-linear algebraic equations. On-line dynamic security assessment (DSA) however requires the handling of a large set of nonlinear differential equations in addition to the nonlinear algebraic equations involved in the SSA. The computational effort required in on-line DSA is roughly three magnitudes higher than that for the SSA.

At present, transient stability analysis programs routinely used in utilities around the world are based exclusively on step-by-step numerical techniques. This practice of power system transient stability via the time-domain approach has a long history. Although the time-domain approach, by its nature, has several advantages, it has several disadvantages. For example, the time-domain approach requires intensive, time-consuming computation efforts; therefore the time-domain approach has not been suitable for on-line application. The time-domain approach does not provide information regarding the degree of stability/instability, or how far the system is from transient instability. This piece of information is valuable for both power system planning and operations. Furthermore, the time-domain approach does not provide information as to how to derive enhancement control or preventive control actions for maintaining system stability.

On-line DSA offers multiple engineering and financial benefits. Some examples are listed below: (i) it can avoid potential blackouts, (ii) a power system can be operated with operating margins reduced by a factor of 10 or more if the dynamic security assessment is based on actual system configurations and actual operating conditions, instead of assumed worst-case conditions, as is done in off-line studies. On-line DSA provides such a capability, which is especially significant in that the demands on current power system environments push the operating conditions of power systems not only with low reserve margins but also closer to their stability limits. (iii) On-line DSA can lead to financial benefits. For instance, it can provide accurate transfer capability constrained by transient stability limit. This accurate calculation of transfer capability would allow remote generators with low production cost to be economically dispatched. The cost saving can be significant, e.g. $300K/day, for a mid-size power system.

From a functional requirements viewpoint, on-line DSA must provide the following Fast stability assessments of a list of credible contingencies Accurate identification of unstable contingencies which has no post-fault steady-state (Contingencies lead to system collapse)

Accurate identification of unstable contingencies which has negative energy margins (Contingencies lead to system transient instability)

Accurate identification of severe contingencies (with small but positive energy margins)

Contingency screening and ranking for transient stability in terms of energy margin or critical clearing time Detailed time-domain simulations of selected unstable or severe contingencies (After the initial event of the contingency, the system variables such as rotor angles, rotor frequencies, voltages, currents, power flows should be simulated as the system responds to controls and protection schemes and to other possible operational events such as arm/disarm special protection schemes, enable/disable control functions, or supervisory switching actions)

To significantly reduce the computational burden required for on-line DSA, the strategy of using an effective scheme to screen out a large number of stable contingencies and to only apply detailed simulation programs to potentially unstable contingencies is well recognized. This strategy has been successfully implemented in on-line SSA and can potentially be applied to on-line DSA. Given a set of credible contingencies, the strategy would break the task of on-line DSA into two assessment stages:

Stage 1: Perform the task of fast dynamic contingency screening to screen out contingencies which are definitely stable from a set of credible contingencies Stage 2: Perform a detailed stability assessment and energy margin calculation of each contingency remaining after Stage 1.

Several research developments in on-line dynamic contingency screening have been reported in the literature. At present, the existing methods for dynamic contingency screening all first perform extensive numerical simulation on a set of credible contingencies using off-line network data in order to capture essential stability features of system dynamical behaviors; they then construct a classifier attempting to correctly classify contingencies on new and unseen network data in an on-line mode. These methods cannot meet the on-line computation requirement as well as reliability requirement.

Recently, a systematic method to find the controlling unstable equilibrium point was developed, called the BCU method, and is disclosed in U.S. Pat. No. 5,483,462 to Chiang [1]. However, it has been found in several numerical studies that the BCU method may fail in the sense that the unstable equilibrium point (UEP) computed by the BCU method may not always lie on the stability boundary of the original post-fault system. Thus, the energy value at the computed UEP which does not lie on the stability boundary of the original post-fault system can not be used as a critical energy for direct stability assessment. Recently, a set of BCU classifiers for the on-line dynamic contingency screening of electric power systems was developed and disclosed in U.S. Pat. No. 5,719,787 to Chiang and Wang [2]. However, numerical simulation results indicate that the BCU classifiers may mis-classify unstable contingencies as stable. For instance, 10 unstable contingencies in a 173-bus power system were mis-classified as stable; hence violating the reliability requirement of a dynamic security classifier.

A set of several improved BCU classifiers for the on-line dynamical security screening of practical power systems were developed, and is disclosed in [3]. The improved BCU classifiers not only meet the five requirements described in [2] for on-line dynamical security assessments. Furthermore, improved BCU classifiers computes energy margins for screened stable contingencies.

At the present time, the only factor that degrades the reliability of the BCU method is that the controlling UEP computed by the BCU method may not always be the true (correct) controlling UEP. However, since the one-parameter transversality conditions, which lie at the heart of the BCU method, are not easily verifiable, one cannot guarantee a 100-percent reliability for the correctness of the CUEPs computed by the BCU method. Hence, new techniques are required which can not only bypass the difficulty of verifying the one-parameter transversality conditions but can also improve the reliability of the BCU method. In this invention, we will present the development of our invented method, termed group-based BCU method, which is to enhance both the reliability and accuracy of the BCU method in computing critical energy values.

We will begin our discussion by introducing the so-called one-parameter transversality conditions on which the theoretical basis of the BCU method is built. Following this, an important issue regarding the verification of the correctness of CUP's computed by the BCU method will be addressed analytically.

2.1 One-parameter Transversality Condition

In the BCU method, the one-parameter transversality condition is a sufficient condition to ensure that the UEP computed by the BCU method lies on the stability boundary of the (post-fault) power system. We point out that the one-parameter transversality condition is not a necessary condition and that the development of a numerical procedure to check the one-parameter transversality condition can be very involved and may be unnecessary. We propose to take another approach to verify whether the UEP computed by the BCU method lies on the stability boundary of the (post-fault) power system. To explain this approach, we first review the one-parameter transversality condition in the BCU method.

In developing a BCU method for a given power system stability model, the associated artificial, reduced-state model must be defined. To explain the reduced-state model, we consider the following generic network-preserving transient stability model, $$0 = \frac{\partial U}{\partial u}(u, w, x, y) + g_1(u, w, x, y) \quad (1)$$
$$0 = -\frac{\partial U}{\partial w}(u, w, x, y) + g_2(u, w, x, y)$$
$$T\dot{x} = -\frac{\partial U}{\partial x}(u, w, x, y) + g_3(u, w, x, y)$$
$$\dot{y} = z$$
$$M\dot{z} = -Dz - \frac{\partial U}{\partial y}(u, w, x, y) + g_4(u, w, x, y)$$

where $U(u,w,x,y)$ is a scalar function. Regarding the original model (1), we choose the following differential-algebraic system as the artificial, reduced-state model.

$$0 = -\frac{\partial U}{\partial u}(u, w, x, y) + g_1(u, w, x, y) \quad (2)$$
$$0 = -\frac{\partial U}{\partial w}(u, w, x, y) + g_2(u, w, x, y)$$
$$T\dot{x} = -\frac{\partial U}{\partial x}(u, w, x, y) + g_3(u, w, x, y)$$
$$\dot{y} = -\frac{\partial U}{\partial y}(u, w, x, y) + g_4(u, w, x, y)$$

The fundamental ideas behind the BCU method can be explained as follows. Given a power system stability model (which admits an energy function), the BCU method first explores the special properties of the underlying model with the aim of defining an artificial, reduced-state model such that the following static as well as dynamic relationships are met.

Static Properties
  (S1) the locations of equilibrium points of the reduced-state model correspond to the locations of equilibrium points of the original model (1). For example, $(\hat{u},\hat{w},\hat{x},\hat{y})$ is an equilibrium point of the reduced-state model if and only if $(\hat{u},\hat{w},\hat{x},\hat{y},0)$ is an equilibrium point of the original model (1), where $0 \in R^m$ and m is an appropriate positive integer,
  (S2) the types of equilibrium points of the reduced-state model are the same as that of the original model. For example, $(u_s,w_s,x_s,y_s)$ is a stable equilibrium point of the reduced-state model if and only if $(u_s,w_s,x_s,y_s,0)$ is a stable equilibrium point of the original model. $(\hat{u},\hat{w},\hat{x},\hat{y})$ is a type-k equilibrium point of the reduced-state model if and only if $(\hat{u},\hat{w},\hat{x},\hat{y},0)$ is a type-k equilibrium point of the original model.

Dynamical Properties
  (D1) there exists an energy function for the artificial, reduced-state model (2).
  (D2) an equilibrium point, say, $(\hat{u},\hat{w},\hat{x},\hat{y})$ is on the stability boundary $\partial A(u_s,w_s,x_s,y_s)$ of the reduced-state model (2) if and only if the equilibrium point $(\hat{u},\hat{w},\hat{x},\hat{y},0)$ is on the stability boundary $\partial A(u_s,w_s,x_s,y_s,0)$ of the original model (1).
  (D3) it is computationally feasible to efficiently detect the point at which the projected fault-on trajectory (u(t),w (t),x(t),y(t)) hit the stability boundary $\partial A(u_s,w_s,x_s,y_s)$ of the post-fault reduced-state model (2) without resorting to an iterative time-domain procedure to compute the exit point of the post-fault reduced-state model (2).

The dynamic relationship (D3) plays an important role in the development of the BCU method to circumvent the difficulty of applying an iterative time-domain procedure to compute the exit point on the original model. The BCU method then finds the controlling UEP of the artificial, reduced-state model (2) by exploring the special structure of the stability boundary and the energy function of the reduced-state model (2). Next, it relates the controlling UEP of the reduced-state model (2) to the controlling UEP of the original model (1).

Given a power system stability model, there exists a corresponding version of the BCU method. The BCU method does not directly compute the CUEP of the original model because computing the exit point of the original model, which is a key to computing the controlling UEP, requires an iterative time-domain procedure. Instead, the BCU method computes the CUEP of the original model (1) via computing the CUEP of the artificial, reduced-state model (2).

We next present some analytical results showing that, under certain conditions, the original model (1) and the artificial, reduced-state model (2) satisfy static relationships (S1) and (S2) as well as dynamic relationships (D1) and (D2). A computational scheme will be developed and incorporated into the BCU method to satisfy dynamic relationship (D3).

Theorem 1: (Static Relationship)

Let $(u_s,w_s,x_s,y_s)$ be a stable equilibrium point of the reduced-state model (2). If the following conditions are satisfied:

(1) zero is a regular value of $$\frac{\partial^4 U(u_i, w_i, x_i, y_i)}{\partial u \partial w \partial x \partial y}$$

for all the UEP $(u_i,w_i,x_i,y_i)$, $i=1,2,\ldots,k$ on the stability boundary $\partial A(u_s,w_s,x_s,y_s)$, (2) the transfer conductance of reduced-state model (2) is sufficiently small, Then, $(\hat{u},\hat{w},\hat{x},\hat{y})$ is a type-k equilibrium point of reduced-state model (2) if and only if $(\hat{u},\hat{w},\hat{x},\hat{y},0)$ is a type-k equilibrium point of the original model (1).

Theorem 1 asserts that, under the stated conditions, the static properties (S1) and (S2) between original model (1) and the reduced-state model (2) hold.

It can be shown that there exists a numerical energy function for the reduced-state model (2). More specifically, it can be shown that for any compact set S of the state-space of model (2), there is a positive number $\alpha$ such that, if the transfer conductance of the model satisfies $|G|<\alpha$, then there is an energy function defined on this compact set S.

To examine the dynamic property (D2), we introduce the following family of one-parametrized systems $d(\lambda)$.

$$\varepsilon_1 \dot{u} = -\frac{\partial U}{\partial u}(u, w, x, y) \quad (3)$$

$$\varepsilon_2 \dot{w} = -\frac{\partial U}{\partial w}(u, w, x, y)$$

$$T\dot{x} = -\frac{\partial U}{\partial x}(u, w, x, y)$$

-continued $$\dot{y} = (1-\lambda)z - \lambda \dot{y} = -\frac{\partial U}{\partial y}(u, w, x, y)$$

$$M\dot{z} = -Dz - (1-\lambda)z - \lambda \dot{y} = -\frac{\partial U}{\partial y}(u, w, x, y)$$

Theorem 1: (Dynamic Relationship)

Let $(u_s,w_s,x_s,y_s)$ be a stable equilibrium point of the reduced-state model (2). If the following conditions are satisfied, (1) zero is a regular value of for all the UEP on the stability boundary.

(2) the transfer conductance of the reduced-state model (2) is sufficiently small, (3) all the intersections of the stable and unstable manifolds of the equilibrium points on the stability boundary $\partial A(u_s,w_s,x_s,y_s,0)$ of the one-parameterized model $d(\lambda)$ (3) satisfy the transversality condition for $\lambda \in [0,1]$, then:

[1] the equilibrium point $(u_i,w_i,x_i,y_i)$ is on the stability boundary $\partial A(u_s,w_s,x_s,y_s)$ of model (2) if and only if the equilibrium point $(u_i,w_i,x_i,y_i,0)$ is on the stability boundary $\partial A(u_s,w_s,x_s,y_s,0)$ of model (1)

[2] the stability boundary $\partial A(u_s,w_s,x_s,y_s)$ of model (2) is the union of the stable manifold of all the equilibrium points $(u_i,w_i,x_i,y_i)$, $i=1, 2, \ldots$, on the stability boundary $\partial A(u_s,w_s,x_s,y_s)$; i.e.

$$\partial A(u_s,w_s,x_s,y_s) = \cup W^s(u_i,w_i,x_i,y_i) \quad (4)$$

[3] the stability boundary $\partial A(u_s,w_s,x_s,y_s,0)$ of model (1) is the union of the stable manifold of all the equilibrium points $(u_i,w_i,x_i,y_i,0)$, $i=1, 2, \ldots$, on the stability boundary $\partial A(u_s,w_s,x_s,y_s,0)$; i.e.

$$\partial A(u_s,w_s,x_s,y_s,0) = \cup W^s(u_i,w_i,x_i,y_i,0) \quad (5)$$

Theorem 1 asserts that, under the stated conditions, conditions (1)-(3), the dynamic property (D2) is satisfied. Furthermore, the stability boundaries of both models are completely characterized. Condition (1) is a generic property while conditions (2) and (3) are not. We will present an approach to check the dynamic property (D2) without checking conditions (2) and (3).

A Conceptual Network-preserving BCU Method

Theorem 1 and Theorem 1 provide the theoretical basis for finding the controlling UEP of the original network-preserving model (1) via the controlling UEP of the artificial, reduced-state model (2). A conceptual BCU method for the network-preserving model is presented in the following:

A conceptual BCU method for the network-preserving model

Step 1. From the (sustained) fault-on trajectory (u(t),w(t),x(t),y(t),z(t)) of the network-preserving model (1), detect the exit point (u*,w*,x*,y*) at which the projected trajectory (u(t),w(t),x(t),y(t)) of the network-preserving model exits the stability boundary of the post-fault reduced-state model (2).

Step 2. Use the point (u*,w*,x*,y*) as the initial condition and integrate the post-fault reduced-state model (2) to find the UEP whose stable manifold contains the exit point (u*,w*,x*,y*).

Step 3. The controlling UEP with respect to the fault-on trajectory of the network-preserving model (1) is $(u_{co}^*, w_{co}^*, x_{co}^*, y_{co}^*, 0)$ The essence of the BCU method is to compute the controlling UEP of the original model (1) via computing the controlling UEP of the reduced-state model (2) whose controlling UEP can be effectively computed. Step 1 and Step 2 of the conceptual BCU method find the controlling UEP of the reduced-state model (i.e. the controlling UEP of the projected fault-on trajectory). Step 3 relates the controlling UEP of the reduced-state model (2) to the controlling UEP of the original model (1). BCU method does not perform its calculation of CUEP in the state-space of the underlying original power system transient stability model. This is because the task of computing the exit point of the original model, which is a key to computing CUEP, requires an iterative time-domain procedure. Instead, BCU method computes the CUEP of the original model via computing the CUEP of an artificial reduced-state model. As such, BCU method computes CUEP with varying degree of success. The UEP computed by the BCU method may not always be the CUEP.

The one-parameter transversality conditions play an important role in the theoretical foundation of the conceptual BCU method. The violation of the one-parameter transversality conditions may cause incorrectness in the BCU method when computing the controlling UEP. However, due to the complexity of practical power system models, the one-parameter transversality conditions may not be always satisfied. There are several counter-examples which show the BCU method may fail to give correct stability assessments.

Based on the above analysis, we will take a different approach. Instead of checking the one-parameter transversality condition and the small-transfer-conductance condition, we propose to directly check whether or not the UEP ($u_{co}^*$, $w_{co}^*, x_{co}^*, y_{co}$, 0) lies on the stability boundary of the original model; i.e. check the dynamic property (D2) directly. We will also term the dynamic property (D2) the boundary property.

It can be shown that the boundary property holds for high damping systems while it may not hold for low damping systems. The issue of how to determine the critical damping value above which the boundary property holds remains open. The critical damping value seems to depend on a variety of factors including network topology, loading condition, and system models used, among others.

Damping Terms and Boundary Property

It has been shown that under the one-parameter transversality condition, BCU method can compute exact CUEP. However, the verification of one-parameter transversality condition is not an easy task either. At the present time, with the development of improved BCU classifiers, the only factor that degrades the reliability of the BCU method (i.e. BCU method gives incorrect stability assessments) is that the unstable equilibrium point (UEP) computed by the BCU method may not always be the true (correct) controlling UEP. Furthermore, UEPs computed by BCU method may not even satisfy the boundary condition. We say a computed UEP (with respect to a contingency) is said to satisfy the boundary condition if the computed UEP lies on the stability boundary of the original post-contingency system.

This factor can clearly explain the reason why the BCU method may give incorrect stability assessments for certain types of contingencies. BCU method fails because of the violation of the boundary condition due to insufficient system damping. Technically speaking, insufficient system damping leads to the occurrence of global bifurcation in the parameterized dynamical systems underlying the BCU method. On the other hand, it has been found that the BCU method performs very well if the boundary condition is satisfied; in addition, the boundary condition is satisfied if the system damping terms are sufficiently large.

The BCU method may give incorrect stability assessments for certain types of contingencies (cases). For illustrative purpose, we will present numerical results in which the BCU method fails to give correct stability assessments for some cases, due to either multi-swing phenomenon or light damping. In all cases, the BCU method fails because of the violation of boundary property. It will be shown that the BCU method works well if the boundary property is satisfied; furthermore, the boundary property is satisfied if the system damping terms are sufficiently large.

Some Numerical Examples

We apply the BCU method to analyze a contingency list of a test system. We present some cases in which the BCU method fails and point out the reasons why this failure occurs.

Table 1 displays some cases in which the BCU method fails to give correct stability assessments. We point out that these cases all exhibit multi-swing phenomena and the boundary properties are not satisfied. All the cases listed in Table 1 belong the same group; group #4. We also present some cases in which the BCU method works well in Table 2. It should be pointed out that all the cases in Table 2 belong to two groups of coherent contingencies, group #13 and group #43, and they all satisfy the boundary condition.

TABLE 1

A group of coherent contingencies which the BCU Method Fails.

| Fault Description | Fault Clearing Time(s) | BCU Margin | BCU Assessment | Time-Domain Assessment | Mode of Instability | Boundary Distance/ UEP Group | Boundary Property |
|---|---|---|---|---|---|---|---|
| Fault Bus 536 | 0.07 | 1.1127 | Stable | Stable | Multi-swing | 0.234/4 | No |
| Open line 536-537 | 0.10 | 0.983 | Stable | Unstable | | 0.234/4 | No |
| Fault Bus 707 | 0.07 | 1.17 | Stable | Stable | Multi-swing | 0.234/4 | No |
| Open line 707-708 | 0.10 | 0.9433 | Stable | Unstable | | 0.234/4 | No |
| Fault Bus 521 | 0.05 | 0.3587 | Stable | Unstable | Multi-swing | 0.232/4 | No |
| Open line 521-522 | 0.07 | 0.2387 | Stable | Unstable | | 0.232/4 | No |
| Fault Bus 52 | 0.05 | 1.0874 | Stable | Unstable | Multi-swing | 0.200/4 | No |
| Open line 52-575 | 0.07 | 0.8627 | Stable | Unstable | | 0.200/4 | No |

TABLE 2

A group of coherent contingencies which the BCU Method Succeeds.

| Fault Description | Fault Clearing Time(s) | BCU Margin | BCU Assessment | Time-Domain Assessment | Mode of Instability | Boundary Distance/ UEP Group | Boundary Property |
|---|---|---|---|---|---|---|---|
| Fault Bus 709 | 0.07 | 0.948 | Stable | Stable | Single-swing | 1.0/43 | Yes |
| Open line 104-709 | 0.10 | −0.225 | Unstable | Unstable |  | 1.0/43 | Yes |
| Fault Bus 38 | 0.07 | 0.468 | Stable | Stable | Multi-swing | 1.0/13 | Yes |
| Open line 38-55 | 0.10 | −0.551 | Unstable | Unstable |  | 1.0/13 | Yes |

TABLE 3

A group of coherent contingencies which the BCU Method Fails.

| Fault Description | Fault Clearing Time(s) | BCU Margin | BCU Assessment | Time-Domain Assessment | Mode of Instability | Boundary Distance/ UEP Group | Boundary Property |
|---|---|---|---|---|---|---|---|
| Fault Bus 3036 | 0.05 | 0.0211 | Stable | Unstable | Multi-swing | 0.200/27 | No |
| Open line 3036-3037 | 0.07 | −0.0695 | Unstable | Unstable |  | 0.200/27 | No |
| Fault Bus 4021 | 0.05 | 1.9706 | Stable | Unstable | Multi-swing | 0.310/39 | No |
| Open line 4021-4022 | 0.07 | 1.9420 | Stable | Unstable |  | 0.310/39 | No |
| Fault Bus 4029 | 0.07 | 0.5595 | Stable | Unstable | Multi-swing | 0.289/35 | No |
| Open line 4026-4029 | 0.27 | −0.3527 | Unstable | Unstable |  | 0.289/35 | No |
| Fault Bus 107 | 0.07 | 0.4302 | Stable | Unstable | Multi-swing | 0.234/52 | No |
| Open line 107-4124 | 0.15 | −0.1049 | Unstable | Unstable |  | 0.234/52 | No |

The Damping Factors

We have observed that the reliability of BCU method in stability assessments increases (i.e., it works on more number of contingencies) as the system damping factors become larger. For example, while BCU method fails on contingencies as listed in Table 3 due to small damping, the method works on some of these contingencies, in particular on the group #52 if the system damping factor increases, as shown in Table 4. It can be seen from this table that the boundary distance becomes closer to 1.0; in other words, the computed CUEP becomes closer to the stability boundary of the original system. Furthermore, the time-domain behaviors of the study power system subject to these contingencies improve; more specifically, the transient stability is enhanced.

As we further increase the damping effect, the reliability of the BCU method is further improved. Table 5 lists the performance of the BCU method for the same cases as those in Table 4, except that the system damping factors are doubled. BCU method computes CUEPs satisfying the boundary property for these contingencies in groups #27, #39 and #52 of coherent contingencies. In addition, the boundary distance of the computed UEP relative to each contingency in group #35 all lies closer to 1.0. These results clearly show that as the system damping factor increases, the boundary distance of the computed CUEP by the BCU method increases and the satisfiablity of boundary condition relative to contingencies by the BCU method also increases. Furthermore, the transient stability of the study power system subject to these contingencies is enhanced.

TABLE 4

BCU method works for group #52 when damping is increased.

| Fault Description | Fault Clearing Time(s) | BCU Margin | BCU Assessment | Time-Domain Assessment | Mode of Instability | Boundary Distance/ UEP Group | Boundary Property |
|---|---|---|---|---|---|---|---|
| Fault Bus 3036 | 0.07 | 0.177 | Stable | Stable | Multi-swing | 0.701/27 | No |
| Open line 3036-3037 | 0.17 | −0.303 | Unstable | Unstable |  | 0.701/27 | No |
| Fault Bus 4021 | 0.07 | 2.727 | Stable | Stable | Multi-swing | 0.824/39 | No |
| Open line 4021-4022 | 0.77 | −0.157 | Unstable | Unstable |  | 0.824/39 | No |
| Fault Bus 4029 | 0.07 | 0.563 | Stable | Stable | Multi-swing | 0.867/35 | No |
| Open line 4026-4029 | 0.37 | −0.048 | Unstable | Unstable |  | 0.867/35 | No |
| Fault Bus 107 | 0.07 | 1.081 | Stable | Stable | Multi-swing | 1.00/52 | Yes |
| Open line 107-4124 | 0.30 | −0.245 | Unstable | Unstable |  | 1.00/52 | Yes |

TABLE 5

BCU method works for groups #27, #39 and #52 when damping is increased.

| Fault Description | Fault Clearing Time(s) | BCU Margin | BCU Assessment | Time-Domain Assessment | Mode of Instability | Boundary Distance/ UEP Group | Boundary Property |
|---|---|---|---|---|---|---|---|
| Fault Bus 3036 | 0.07 | 0.934 | Stable | Stable | Multi-swing | 1.00/27 | Yes |
| Open line 3036-3037 | 0.17 | 0.525 | Stable | Stable | | 1.00/27 | Yes |
| Fault Bus 4021 | 0.07 | 2.813 | Stable | Stable | Multi-swing | 1.00/39 | Yes |
| Open line 4021-4022 | 0.77 | 1.750 | Stable | Stable | | 1.00/39 | Yes |
| Fault Bus 4029 | 0.07 | 0.588 | Stable | Stable | Multi-swing | 0.948/35 | No |
| Open line 4026-4029 | 0.37 | 0.279 | Stable | Stable | | 0.948/35 | No |
| Fault Bus 107 | 0.07 | 1.182 | Stable | Stable | Multi-swing | 1.00/52 | Yes |
| Open line 107-4124 | 0.30 | 0.306 | Stable | Stable | | 1.00/52 | Yes |

From the viewpoint of state space, the increase of the boundary distance of the computed UEP due to the increase of the system damping clearly demonstrates the effect of damping terms on transient stability; it enhances the transient stability by enlarging the stability region of the post-fault SEP, hence it increases the critical clearing times as well as the energy margin.

These observations will lead to the development of a group-based BCU method in which the boundary property will be checked. In order to develop schemes for an efficient check of the boundary property, the concept of a group of coherent contingencies will be proposed and explored. Several group properties will be explored and investigated. These group properties will be taken into the development of the group-based BCU method. The group-based BCU method will also include a scheme to compute the critical energy for those contingencies in which the boundary property is not satisfied.

With the introduction of a boundary property, one can check the correctness of a computed CUEP, say by the BCU method, through checking its boundary property; instead of checking the one-parameter transversality condition which is very difficult to check. By computing the boundary distance of the computed CUEP, one can verify whether or not the computed CUEP lies on the stability boundary of the original system; if the boundary of the computed CUEP is 1.0, then the CUEP lies on the stability boundary of the original post-fault system; otherwise, it is not.

It will be shown that the boundary property is a group property (a group property is a property which holds for every member in the group); hence it is not necessary to compute the boundary distance for each computed UEP in each group of coherent contingencies. Computing the boundary distance of a UEP in a group of coherent contingencies is sufficient to determine the boundary property of all of the contingencies in the group. The exploration of the group property will lead to a significant reduction in computation, as will be explained later.

We will describe in this invention a novel system, called Group-based BCU-DSA, for on-line dynamic security assessments and energy margin calculations of practical power systems in modern energy management systems. The novel system meets the requirements of on-line dynamic security assessment and energy margin calculations through effective exploration of the merits of both the group-based BCU method (and the improved BCU classifiers) and the detailed time-domain simulation program. There are three major components in this architecture: (i) a sequence of improved BCU classifiers whose major functions are to screen out, from a set of credible contingencies, all of those contingencies which are definitely stable and to capture all of the (potentially) unstable contingencies, (ii) a BCU-guided time-domain program for stability analysis and energy margin calculation of both the (potentially) unstable and undecided contingencies captured by the sequence of improved BCU classifiers in (i), and (iii) a group-based BCU method.

BRIEF SUMMARY OF THE INVENTION

To fulfill the foregoing urgent needs, the present invention provides a reliable and effective system, Group-based BCU-DSA, for performing on-line dynamic security assessment (DSA) and energy margin calculations of practical power systems. In particular, the present invention develops the following:
  (i) Verification schemes for checking boundary property
  (ii) BCU-exit-point Method
  (iii) Group of coherent contingencies
  (iv) Group-based Verification Scheme
  (v) Group-based BCU-exit-point Method
  (vi) Group-based BCU Method
  (vii) Revised BCU Classifiers
  (viii) Group-based BCU-DSA 3.1 Verification Scheme We propose in this invention a verification scheme for checking the boundary condition of a computed UEP by the BCU method. This verification scheme overcomes the very difficult task of checking the one-parameter transversality condition. We present a computational procedure for checking whether or not a UEP, say $X^{UEP}$ lies on the stability boundary of a SEP, say a $X_s^{post}$ general nonlinear dynamical system Step 1. (Selection Step)
  Select a point (test vector). In practical implementation, we compute a test vector for each selected UEP, say $X^{UEP}$, using the following equation $$X^{test} = X_s^{post} = \alpha(X^{UEP} - X_s^{post})$$

where $\alpha<1$ is a positive number and close to 1.0, say for example 0.99, and $X_s^{post}$ is the SEP.

Step 2. (Checking Step)
  Check the boundary condition of $X^{UEP}$ by simulating the system trajectory of the post-fault original system starting from $X^{test}$. If the ensuing system trajectory converges to $X_s^{post}$, then $X^{UEP}$ lies on the stability boundary the post-fault original system; otherwise, it does not.

3.2 BCU-Exit Point Method

If the boundary condition of a computed UEP is violated, then the computed UEP does not lie on the stability boundary of the original (post-fault) system. It is hence inappropriate to use the energy value at the computed UEP as the critical energy. The issue then becomes how to find a point whose energy value can be used as a critical energy when the boundary condition is violated. In this invention, we develop a BCU-Exit point method to address this issue.

BCU-Exit Point Method

Given: a power system transient stability model, a study contingency and an energy function for the post-fault power system model Step 1. Use the BCU method to compute the CUEP and the post-fault SEP of the study contingency 2. Apply the verification procedure to the computed CUEP in Step 1. If the boundary condition is satisfied, then the critical energy value of the study contingency is the energy value at the computed CUEP and go to Step 4; otherwise, go to next step Step 3. Apply an effective time-domain-based method to compute the corresponding BCU-Exit point. The critical energy value of the study contingency is the energy value at the BCU-Exit point.

Step 4. Based on the critical energy value, perform a stability assessment and calculate the energy margin for the study contingency

3.3 Group of Coherent Contingencies

In this invention, we develop the concept of group of coherent contingencies and explore several properties within the group of coherent contingencies. We discover that the UEPs computed by the BCU method with respect to a group of contingencies tend to be close to each other. These UEPs are close to each other in the state space while the fault locations of the group of contingencies are close to each other in the geographical space. This group of contingencies is referred to as a group of coherent contingencies. We also discover that a list of contingencies can be classified into groups of coherent contingencies. Some groups may contain a large number of contingencies while others may contain a small number of contingencies.

We discover that within each group of coherent contingencies, the UEP with the greatest SEP separation and the UEP with the smallest SEP separation define the boundary property for all UEPs in the group; more specifically, we discover the following group properties:

Group Property 1: If both the UEP with the largest SEP separation and the UEP with the smallest SEP separation satisfy the boundary property, then each UEP of the entire coherent group lies on the stability boundary of the corresponding original system. In other words, if the UEPs at 'both ends' of the coherent group lie on the stability boundary of the corresponding original system, then the UEPs of the entire group also lie on the stability boundary of the original system.

Group Property 2: If both the UEP with the largest SEP separation and the UEP with the smallest SEP separation do not satisfy the boundary property, then the UEPs of the entire group do not lie on the stability boundary of the original system.

Group property 1 can be expressed as follows if the difference between the largest SEP separation and the smallest SEP separation is small:

Group Property 1-A: If the UEP with the largest SEP separation satisfies the boundary property, then each UEP of the entire coherent group lies on the stability boundary of the corresponding original system.

Group property 2 can be expressed as follows if the difference between the largest SEP separation and the smallest SEP separation is small:

Group Property 2-A: If the UEP with the largest SEP separation does not satisfy the boundary property, then each UEP of the entire coherent group does not lie on the stability boundary of the corresponding original system.

We develop the following guideline for re-grouping a group of coherent contingencies into several groups of coherent contingencies so that Property 1 and Property 2 are satisfied.

Guideline for re-grouping: If one of the two UEPs, either the UEP with the largest SEP separation or the UEP with the smallest SEP separation, satisfies the boundary property while the other does not, then some UEPs of the entire coherent group satisfy the boundary property while the others do not.

Given a contingency list, we apply the BCU method to compute the controlling UEP for each contingency in the contingency list. We then group all the contingencies in the contingency list into groups of coherent contingencies based on the difference between the coordinates of the computed UEP and their SEP separations. Several grouping schemes can be developed; however, they should satisfy Property 1 and Property 2.

3.4 Group-based Verification Schemes

In this invention, we develop an effective numerical procedure for checking whether or not each computed UEP (relative to a contingency) in a coherent group lies on the stability boundary of its corresponding original (post-fault) system. In particular, we develop in this invention a group-based procedure to check the boundary property for a group of coherent contingencies.

A Group-based Verification Procedure

Step 0: Given a group of coherent contingencies.

Step 1. (Selection Step)

For the group of coherent contingencies, we propose the following criterion to select one contingency or two contingencies from the group of coherent contingencies for the verification of boundary property. If the SEP separation of each contingency in the coherent contingencies is small, say less than 3 degrees, then the computed UEP with the largest SEP separation in the group is selected; otherwise, the computed UEP with the largest SEP separation and the one with the smallest SEP separation in the group are selected.

Step 2. (Checking Step)

Check the boundary condition of the computed UEP(s) which correspond to the selected contingency in the selection step. We compute a test vector for each selected UEP, say $X^{UEP}$, using the following equation $$X^{test} = X_s^{post} + 0.99(X^{UEP} - X_s^{post})$$

where $X_s^{post}$ is the post-fault SEP of the contingency which corresponds to $X^{UEP}$. The post-fault trajectory starting from $X^{test}$ is simulated and assessed. If the post-fault trajectory converges to $X_s^{post}$, then the selected UEP, $X^{UEP}$, satisfies the boundary condition; otherwise, it does not.

Step 3. (Assessment Step)

Based on the checking results of Step 2, the following assessment results are obtained.

(1) If the selected UEPs satisfy the boundary condition, then the computed UEPs of the coherent contingencies in the entire group lie on the stability boundary of the (original) post-fault system.

(2) If none of the selected UEPs satisfy the boundary condition, then the UEPs of the entire group lie outside the stability boundary of the (original) post-fault system.

3.5 Group-based BCU-Exit-point Method

We develop in this invention a group-based BCU-Exit point method by exploring some group properties to overcome the difficulty of computing the BCU-Exit point for each contingency in a coherent group. Given a group of coherent contingencies which violate the boundary condition, we develop the following group-based BCU-Exit method which computes a critical energy for each contingency in the group. The flow chart of the group-based BCU-Exit method is then shown (See FIG. 3).

Group-based BCU-Exit Point Method

Given: a group of coherent contingencies which violates the boundary condition, the following steps determine a critical energy for each contingency in the coherent group.

Step 1. (Selection Step)

From the group of coherent contingencies, select the computed UEP which has the largest SEP separation, say $X_l^{UEP}$ with respect to contingency, say $L_l$, and select the computed UEP which has the smallest SEP separation, say $X_s^{UEP}$, with respect to contingency, say $L_s$.

Step 2. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 3. (Critical Energy)

Use the energy at $X_l^{bcu}$, denoted as $V_l^{bcu}$, as the critical energy for the contingency $L_s$. Likewise, use the energy at $X_s^{bcu}$, denoted as $V_s^{bcu}$, as the critical energy for the contingency $L_s$.

Step 4. (Critical Energy for the Other Contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

3.6 Group-based BCU Method

We develop in this invention a group-based BCU method which incorporate the group-based verification scheme, the group-based BCU-Exit point method of this invention. The invented group-based BCU method can improve not only the reliability of BCU method but also the conservativeness of the BCU method in direct transient stability assessments.

Group-based BCU Method

Step 1. Use BCU method to compute the controlling UEP and the post-fault SEP of each study contingency of a contingency list until the contingency list is finished.

Step 2. (Grouping step) group the computed UEPs associated with each contingency into groups of coherent contingencies such that they satisfy Property 1 and Property 2.

For each group of UEPs, perform the following steps:

Step 3. (Selection step) If the SEP separation of each contingency in the group is small, say less than 3 degrees, then the UEP with the greatest SEP separation is selected; otherwise the UEP with the greatest SEP separation and the UEP with the smallest SEP separation are selected.

Step 4. (Checking step) Check the boundary property of the selected UEP(s). In practical implementation, we compute a test vector for each selected UEP, say $X^{UEP}$, using the following equation $$X^{test} = X_s^{post} + \alpha(X^{UEP} - X_s^{post})$$

where $\alpha < 1$ is a positive number and close to 1.0, say for example 0.99, $X_s^{post}$ is the post-fault SEP of the contingency and $X^{UEP}$ is the selected UEP. The post-fault trajectory starting from $X^{test}$ is simulated and assessed. If the post-fault trajectory converges to $X_s^{post}$, then the selected UEP, $X^{UEP}$, satisfies the boundary property; otherwise, it does not.

Step 5. If the selected UEPs satisfy the boundary property, then the UEPs of the entire group lie on the stability boundary of the original system and go to Step 6. If none of the selected UEPs satisfy the boundary property, then the UEPs of the entire group lie outside the stability boundary and go to Step 7.

Step 6. The critical energy value of each study contingency in the groups of coherent contingencies is the energy value at the computed UEP and go to Step 11;

Step 7. Let the selected UEP which has the largest SEP separation be denoted as $X_l^{UEP}$ with respect to contingency, say $L_l$, and let the selected UEP which has the smallest SEP separation be denoted as $X_s^{UEP}$, with respect to contingency, say $L_s$.

Step 8. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 9. (Critical Energy)

Use the energy at $X_l^{bcu}$, denoted as $V_l^{bcu}$, as the critical energy for the contingency $L_s$. Likewise, use the energy at $X_s^{bcu}$, denoted as $V_s^{bcu}$, as the critical energy for the contingency $L_s$.

Step 10. (Critical energy for the other contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

Step 11. Based on the critical energy, perform a direct stability assessment and calculate the energy margin for each study contingency in the group of coherent contingencies.

3.7 Revised BCU Classifiers

The main design goal of the revised BCU classifiers is to ensure that all five requirements for on-line dynamic contingency screening described in [3] are met.

Input: a power system model with related data for dynamic security assessment and a study contingency.

Output: stability assessment and energy margin value for the contingency on the power system.

The revised BCU Classifiers are executed in the following steps (see FIG. 4):

Step 1. BCU Classifier I: When a contingency is sent to the revised BCU Classifiers, the program first checks BCU classifier I which is a classifier for detecting the problem of network islanding. If BCU classifier I is triggered, then the power system is separated into several parts caused by the contingency and hence, the power system under the contingency is considered highly unstable and a large negative energy margin, say −999 is assigned to the study contingency and stop the procedure; otherwise, the study contingency is sent to BCU classifier II.

Step 2. BCU Classifier II-A and BCU Classifier II-B: The post-fault SEP under the study contingency is computed. If no post-fault SEP is found or a post-fault SEP is found but it is too far away from pre-fault SEP, then Classifier 2-A is triggered and the study contingency is assessed highly unstable and a large negative energy margin, say −999 is assigned to the study contingency and stop the procedure; otherwise, if the post-fault SEP is moderately far away from the pre-fault SEP, the Classifier 2-B is triggered and the study contingency is still considered as highly unstable, but a time-domain is needed to verify the preliminary assessment. If it is indeed unstable, then a large negative energy margin, say −999 is assigned to the study contingency and stop the procedure; otherwise, the study contingency is sent to BCU classifier III.

Step 3. BCU Classifier III: The exit point is computed. If an exit point is not found within a specified period and the potential energy at the end point of the specified period is non-positive, then BCU classifier III is triggered. the study contingency is assessed as highly stable; then a large energy margin, say 999 is assigned to the study contingency and stop the procedure; otherwise, the study contingency is sent to BCU classifier IV.

Step 4. BCU Classifier IV: The Minimal Gradient Point (MGP) is computed. If the procedure of ray adjustment fails or a MGP point can not be found within a specified number of steps in ray adjustment, then BCU Classifier IV is triggered and the study contingency is sent to the BCU-guided time-domain simulation engine for stability assessment and energy margin calculation and stop the procedure; otherwise, the study contingency is sent to BCU classifier V.

Step 5. BCU Classifier V: The Controlling UEP is computed. If a Controlling UEP can not be found, then BCU Classifier V is triggered and the study contingency is sent to he BCU-guided time-domain simulation engine for stability assessment and energy margin calculation and stop the procedure; otherwise, the study contingency is sent to BCU classifier VI.

Step 6. BCU Classifier VI: The energy margin is computed based on the energy value at the computed Controlling UEP. If the energy margin is positive, then the study contingency is assessed as stable; otherwise, the study contingency is assessed as unstable. The procedure is completed.

Step 6 of the revised BCU classifiers can be modified so as to improve the conservative nature of the BCU method as described in the following Step 7. BCU Classifier VI: The energy margin is computed based on the energy value at the computed Controlling UEP. If the energy margin is negative, then this case is assessed as unstable and a time-domain simulation engine is needed to verify the assessment. When the assessment is reversed by the time-domain engine, then its energy margin is recalculated using the BCU-guided time-domain calculation engine. If the energy margin is positive, then the corresponding energy margin and stability assessment is kept unchanged and stop the procedure.

3.8 Group-based BCU-DSA

The present invention provides a novel system, Group-based BCU-DSA, for performing on-line dynamic security assessment and energy margin calculations of practical power systems. The architecture of Group-based BCU-DSA is comprised of three major components: a dynamic contingency classification program made up of eight revised BCU classifiers and a BCU-guided time-domain simulation program and group-based BCU method. Version I of group-based BCU-DSA system is executed in the following steps Input: a power system model with related data for dynamic security assessment and a list of credible contingencies.

Output: stability assessment (i.e. stable or unstable), energy margin value, and estimated critical clearing time for each contingency of the list of credible contingencies.

Each contingency is executed in the following steps:

Step 0: Input each contingency of the list of credible contingencies sequentially Revised BCU Classifiers and BCU-guided Time-domain Program:

Step 1. BCU Classifier I: When a contingency is sent to the revised BCU Classifiers, the program first checks BCU classifier I which is a classifier for detecting the problem of network islanding. If BCU classifier I is triggered, then the power system is separated into several parts caused by the contingency and hence, the power system under the contingency is considered highly unstable and a large negative energy margin, say −999 is assigned to the study contingency, the estimated critical clearing time is zero and go to Step 0; otherwise, the study contingency is sent to BCU classifier II.

Step 2. BCU Classifier II-A and BCU Classifier II-B: The post-fault SEP under the study contingency is computed. If no post-fault SEP is found or a post-fault SEP is found but it is too far away from pre-fault SEP, then Classifier 2-A is triggered and the study contingency is assessed highly unstable and a large negative energy margin, say −999 is assigned to the study contingency, the estimated critical clearing time is zero and go to Step 0; otherwise, if the post-fault SEP is moderately far away from the pre-fault SEP, the Classifier 2-B is triggered and the study contingency is still considered as highly unstable, but a time-domain is needed to verify the preliminary assessment. If it is indeed unstable, then a large negative energy margin, say −999 is assigned to the study contingency, the estimated critical clearing time is zero and go to Step 0; otherwise, the study contingency is sent to BCU classifier III.

Step 3. BCU Classifier III: The exit point is computed. If an exit point is not found within a specified period and the potential energy at the end point of the specified period is non-positive, then BCU classifier III is triggered. the study contingency is assessed as highly stable; then a large energy margin, say 999 is assigned to the study contingency, the estimated critical clearing time is termed very large and go to Step 0; otherwise, the study contingency is sent to BCU classifier IV.

Step 4. BCU Classifier IV: The Minimal Gradient Point (MGP) is computed. If the procedure of ray adjustment fails or a MGP point can not be found within a specified number of steps in ray adjustment, then BCU Classifier IV is triggered and the study contingency is sent to the BCU-guided time-domain simulation engine for stability assessment and energy margin calculation and output the critical clearing time based on the energy margin and the energy along the fault-on trajectory, and go to Step 0; otherwise, the study contingency is sent to BCU classifier V.

Step 5. BCU Classifier V: The Controlling UEP is computed. If a Controlling UEP can not be found, then BCU Classifier V is triggered and the study contingency is sent to he BCU-guided time-domain simulation engine for stability assessment and energy margin calculation and output the critical clearing time based on the energy margin and the energy along the fault-on trajectory, and go to Step 0; otherwise, the study contingency is sent to BCU classifier VI.

Group-based BCU Method

Step 6. Store the computed UEP and the post-fault SEP of each study contingency that sent to this step. Check whether or not the contingency list is finished. If the contingency list is finished, then go to next Step; otherwise, go to Step 0.

Step 7. (Grouping step) group the computed UEPs associated with each contingency into groups of coherent contingencies such that they satisfy Property 1 and Property 2.

For each group of computed UEPs, perform the following steps until all the groups of coherent contingencies are executed:

Step 8. (Selection step) If the SEP separation of each contingency in the group is small, say less than 3 degrees, then the UEP with the greatest SEP separation is selected; otherwise the UEP with the greatest SEP separation and the UEP with the smallest SEP separation are selected.

Step 9. (Checking step) Check the boundary property of the selected UEP(s). In practical implementation, we compute a test vector for each selected UEP, say $X^{UEP}$, using the following equation $$X^{test} = X_s^{post} + \alpha(X^{UEP} - X_s^{post})$$

where $\alpha<1$ is a positive number and close to 1.0, say for example 0.99, $X_s^{post}$ is the post-fault SEP of the contingency and $X^{UEP}$ is the selected UEP. The post-fault trajectory starting from $X^{test}$ is simulated and assessed. If the post-fault trajectory converges to $X_s^{post}$, then the selected UEP, $X^{UEP}$, satisfies the boundary property; otherwise, it does not.

Step 10. If the selected UEPs satisfy the boundary property, then the UEPs of the entire group lie on the stability boundary of the original system and go to Step 11. If none of the selected UEPs satisfy the boundary property, then the UEPs of the entire group lie outside the stability boundary and go to Step 12.

Step 11. The critical energy value of each study contingency in the groups of coherent contingencies is the energy value at the computed UEP and go to Step 16;

Step 12. Let the selected UEP which has the largest SEP separation be denoted as $X_l^{UEP}$ with respect to contingency, say $L_l$, and let the selected UEP which has the smallest SEP separation be denoted as $X_s^{UEP}$, with respect to contingency, say $L_s$.

Step 13. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 14. (Critical Energy)

Use the energy at $X_l^{bcu}$, denoted as $V_l^{bcu}$, as the critical energy for the contingency $L_s$. Likewise, use the energy at $X_s^{bcu}$, denoted as $V_s^{bcu}$, as the critical energy for the contingency $L_s$.

Step 15. (Critical energy for the other contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

Step 16. Based on the critical energy, perform a direct stability assessment and calculate the energy margin and output the critical clearing time based on the energy margin and the energy along the fault-on trajectory for each study contingency in the group of coherent contingencies.

The group-based BCU-DSA system (version II) is executed in the same order of steps as the group-based BCU-DSA system (version I) except that Step 16 is extended as follows:

Step 16. Based on the critical energy, perform a direct stability assessment and calculate the energy margin and output the critical clearing time based on the energy margin and the energy along the fault-on trajectory for each study contingency in the group of coherent contingencies.

Step 17. For each group of coherent contingencies, if a contingency in the group is assessed as unstable, then go to Step 18; otherwise, check for the next group of coherent contingencies until all the groups of coherent contingencies have been checked.

Step 18. Perform a time-domain simulation of the corresponding post-fault system with the state at the fault-clearing time as the initial condition. If the post-fault trajectory is assessed as unstable, then the corresponding energy margin, stability assessment and estimated critical clearing time are kept unchanged; otherwise, it is a stable contingency and sent to the BCU-guided time-domain simulation for energy margin calculation and critical clearing time estimation. And go to Step 17.

A complete group-based analysis of single-member group for boundary distance calculation and critical energy calculation may not be necessary. We propose that group-based BCU-DSA applies the group-based BCU method to multiple-member groups of coherent contingencies group-based BCU-DSA applies the BCU-guided time-domain method to single-member groups of coherent contingencies Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
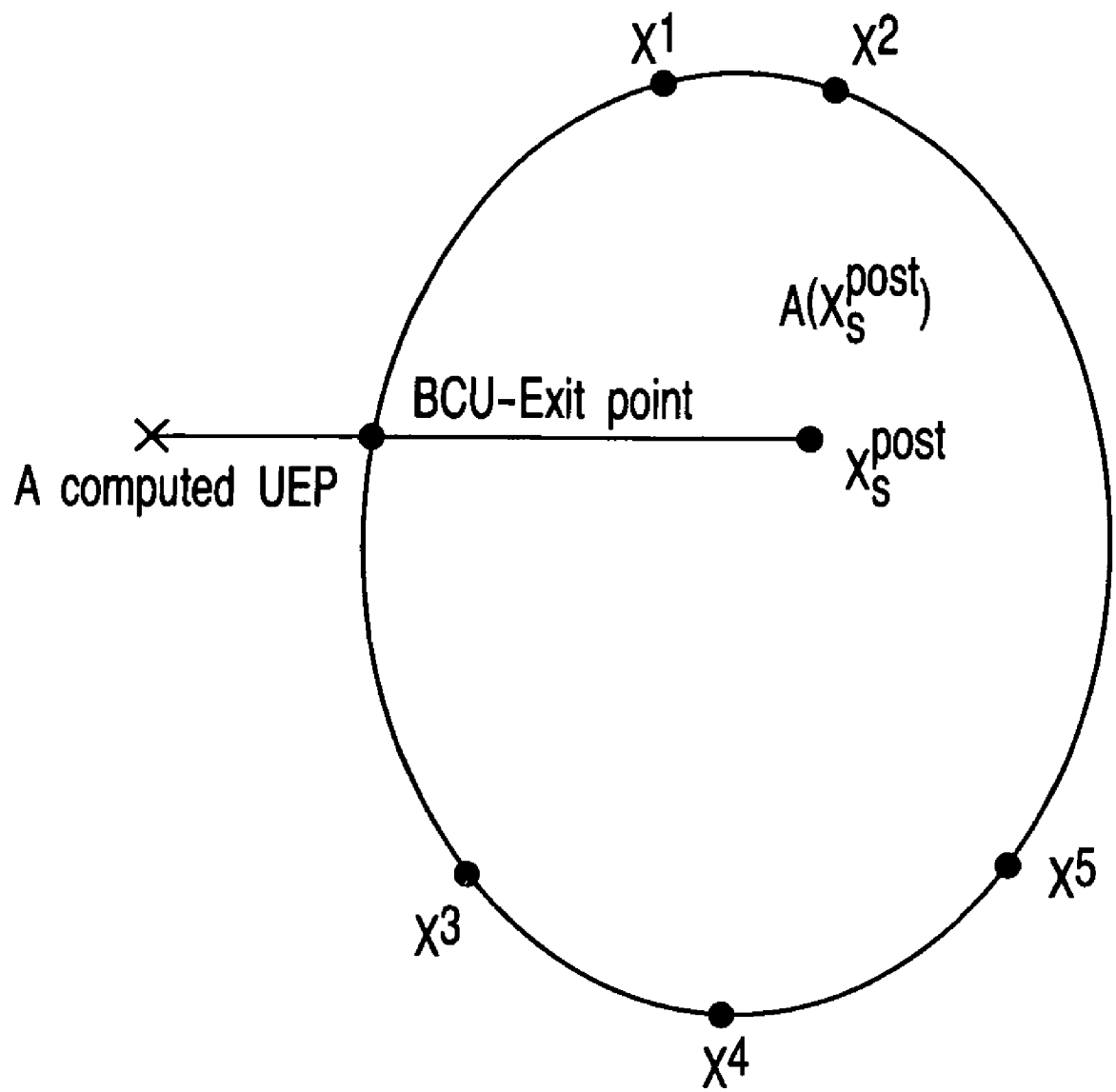
FIG. 1 is to illustrate the concept of BCU-Exit-point.

A preferred embodiment of the present invention will now be described with reference to the accompanying drawings.

At the present time, with the development of improved BCU classifiers, the only factor that degrades the reliability of the BCU method (i.e. BCU method gives incorrect stability assessments) is that the unstable equilibrium point (UEP) computed by the BCU method may not always be the true (correct) controlling UEP. Furthermore, UEPs computed by BCU method may not even satisfy the boundary condition. Recall that a computed UEP (with respect to a contingency) is said to satisfy the boundary condition if the computed UEP lies on the stability boundary of the original post-contingency system.

This factor can clearly explain the reason why the BCU method may give incorrect stability assessments for certain types of contingencies. BCU method fails because of the violation of the boundary condition due to insufficient system damping. Technically speaking, insufficient system damping leads to the occurrence of global bifurcation in the parameterized dynamical systems underlying the BCU method. On the other hand, it has been found that the BCU method performs very well if the boundary condition is satisfied; in addition, the boundary condition is satisfied if the system damping terms are sufficiently large.

These developments enable us to verify BCU method through checking its boundary condition rather than checking the one-parameter transversality condition, which is very difficult to check. By computing the boundary distance of the computed UEP, one can verify whether or not the computed UEP lies on the stability boundary of the original system; if the boundary distance of the computed UEP is 1.0, then the UEP lies on the stability boundary of the original post-fault system; otherwise, it does not.

We have discovered that the boundary condition is a group property (a group property is a property which holds for every contingency in the group). Hence, it is not necessary to compute the boundary distance of every computed UEP in each group of coherent contingencies. It is sufficient only computing the boundary distance of a computed UEP, which corresponds to a contingency in a group of coherent contingencies in order to verify the boundary condition for the other contingencies in the group. The exploration of group properties indeed leads to a significant reduction in computation. Compared with the procedure of verifying BCU method based on a one-to-one contingency basis, the procedure of verifying BCU method for a entire group of contingencies, by exploring group properties of coherent contingencies, is far more effective. This is the spirit of group-based BCU method.

5.1 Boundary Property

In BCU method, boundary property is an important property that relates a computed UEP of the reduced-state system to the corresponding UEP of the original system. The satisfaction of boundary property of a computed UEP ensures that, relative to a computed UEP of the reduced-state system, the corresponding UEP of the original system lies on the stability boundary of the original system. It also ensures that the energy value at the computed UEP can be used as a critical energy for the study contingency.

Figure 2A:
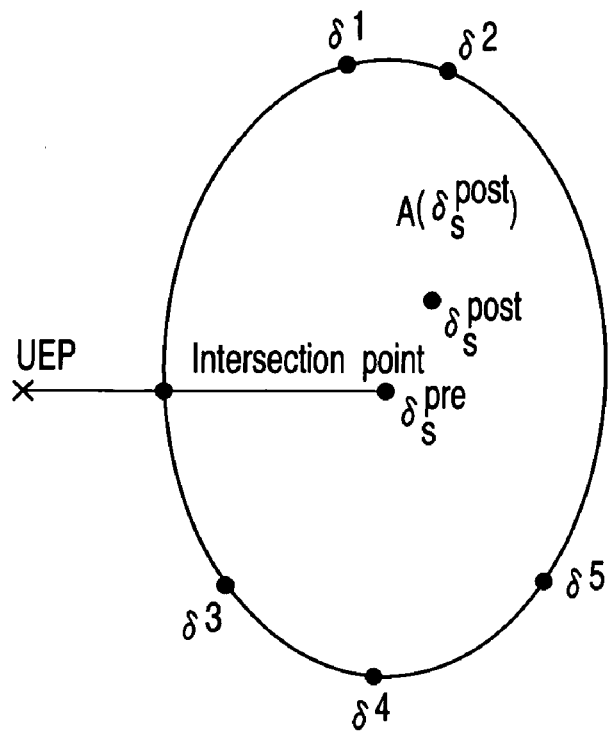
FIGS. 2A and 2B are to illustrate the concept of boundary distance and the boundary condition.
Figure 2B:
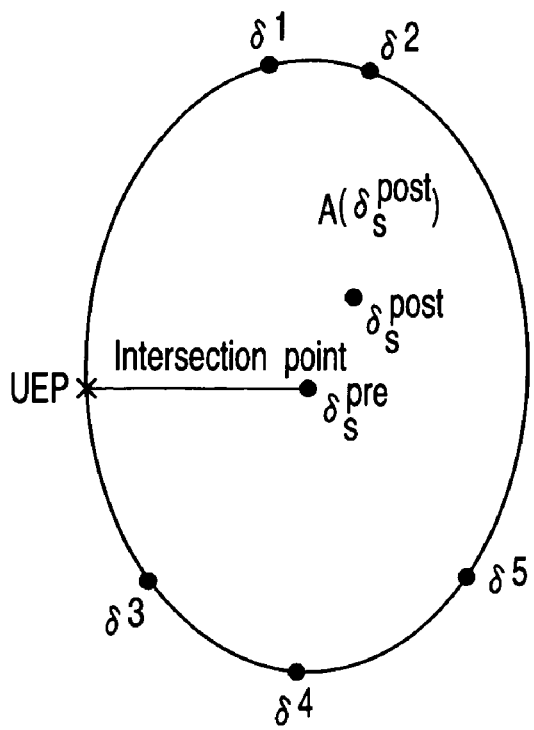

In general, BCU method performs well on those contingencies which satisfy the boundary condition; i.e. the boundary property holds. On the other hand, BCU method may give inaccurate stability assessment and energy margin calculation for those contingencies which violate the boundary condition. To check the boundary condition, we develop in this invention a performance index, called the boundary distance (BD). This index is developed for numerical verification of the boundary condition of a computed UEP. A computed UEP lies on the stability boundary of the original post-fault system if and only if its boundary distance is 1.0. If a computed UEP by the BCU method lies on the stability boundary of the original post-fault system, then the energy value at the computed UEP can be used as the critical energy for the study contingency. Note that the concept of boundary distance can be clearly explained with the help of graphic illustrations. Given a computed UEP, we draw a ray between the computed UEP and its post-fault SEP and identify the intersection point between the ray and the stability boundary of the original system. If the computed UEP lies outside the stability region, the ray will intersect with the stability boundary of the post-fault SEP. The first intersecting point along the ray starting from the SEP is termed the BCU-exit point (or UEP-exit point) (see FIG. 1). FIG. 1 shows that, when a computed UEP, a ray between the computed UEP, which lies outside the stability region, and its post-fault SEP. The (first) intersection point along the ray starting from the SEP between the ray and the stability boundary is the BCU-Exit point. If the computed UEP satisfies the boundary condition, the BCU-exit point is the computed UEP itself. The intersection point can be computed by using the time-domain simulation approach. We then define the boundary distance of the computed UEP as the scalar which is the Euclidean distance between the intersection point and the post-fault SEP divided by the Euclidean distance between the computed UEP and its post-fault SEP (see FIG. 2). FIG. 2 shows, when a computed UEP is given, a ray between the computed UEP and its post-fault SEP. The intersection point between the ray and the stability boundary is the intersection point along the ray. If the boundary distance of a UEP is less than 1.0 (see part a), then the UEP lies outside the stability boundary; otherwise, it lies on the stability boundary (see part b). Note that the boundary distance of a UEP is no greater than 1.0. If the boundary distance of a UEP is 1.0, then the UEP lies on the stability boundary of the original system; otherwise, it lies outside of the stability boundary. Hence, the smaller the boundary distance, the farther away the UEP is from the stability boundary of the original system. Since the computed UEP equals the BCU-exit point if and only if the computed UEP lies on the stability boundary of the original post-fault system, the computed UEP lies on the stability boundary of the original post-fault system if and only if its boundary distance is 1.0.

From a practical viewpoint, a computed UEP is considered as lying on the stability boundary of the original post-fault system if its boundary distance is closed to 1.0, say between 0.97 and 1. This is due to the considerations that numerical errors can occur during the computation process.

5.2 Verification Scheme

We propose in this invention a verification scheme for checking the boundary condition of a computed UEP by the BCU method. This verification scheme overcomes the very difficult task of checking the one-parameter transversality condition. By computing the boundary distance of the computed UEP, one can verify whether or not the computed UEP lies on the stability boundary of the original system; if the boundary distance of the computed UEP is 1.0, then the UEP lies on the stability boundary of the original post-fault system; otherwise, it does not.

It is well recognized that the task of checking whether or not a UEP lies on the stability boundary of a general nonlinear dynamical system is rather time-consuming. We present a computational procedure for checking whether or not a UEP, say $X^{UEP}$ lies on the stability boundary of a SEP, say a $X_s^{post}$ general nonlinear dynamical system Step 1. (Selection Step)

Select a point (test vector). In practical implementation, we compute a test vector for each selected UEP, say $X^{UEP}$, using the following equation $$X^{test} = X_s^{post} + 0.99(X^{UEP} - X_s^{post})$$

where $X_s^{post}$ is the SEP.

Step 2. (Checking Step)

Check the boundary condition of $X^{UEP}$ by simulating the system trajectory of the post-fault original system starting from $X^{test}$. If the ensuing system trajectory converges to $X_s^{post}$, then $X^{UEP}$ lies on the stability boundary the post-fault original system; otherwise, it does not.

The theoretical basis of the above procedure is the property of stability boundary. If $X^{UEP}$ lies on the stability boundary, then the test vector $X^{test}$ must lie inside the stability region; otherwise, $X^{UEP}$ must lie outside the stability boundary. The computational effort required in the above procedure roughly equals one time-domain trajectory simulation.

The above procedure can be applied to verify each UEP computed by BCU method. This verification procedure however requires one time-domain trajectory simulation of the post-fault original system. To improve upon the verification procedure, we have discovered the existence of groups of coherent contingencies in a contingency list and their group properties. In other words, we have discovered the formation of several groups of coherent contingencies in a contingency list and their group properties. We have also explored these group properties to improve the verification procedure for each group of coherent contingencies. Specifically, we have developed a group-based verification scheme for fast and yet accurately verifying the boundary condition for each computed UEP relative to each contingency in the group of coherent contingencies. The details will be presented later on.

It is interesting to note that in our numerical study on two test systems, the ratio of all the computed UEPs satisfying the boundary condition ranges from 87.0% to 87.7% in these two test systems. The two test systems are a 116-machine system and a 134-machine system.

5.3 Corrective Scheme—BCU-exit Point Method

Direct methods for transient stability analysis determine whether or not a post-fault system trajectory will remain stable by comparing the system energy at the state immediately after the underlying fault is cleared with a critical energy. If the energy at the fault clearing point is less than the critical energy, then the post-fault system trajectory is stable; otherwise, it may be unstable. Hence, inaccurate determination of critical energy values can lead to the following problems:

Problem 1 (P1): An over-valued critical energy would classify a unstable contingency as stable.

Problem (P2): An unduly conservative calculation of critical energy would classify a stable contingency as unstable.

It is hence essential to calculate accurate critical energy values for correct stability assessments of contingencies.

We have developed theoretical results to show that the exact critical energy value for a contingency is the energy value at the (original) exit point, which is the intersection between the fault-on trajectory and the stability boundary of the post-fault power system; in addition, the (original) exit point corresponds to the critical clearing time (CCT) in the time-domain simulation. To improve the computational efforts in obtaining the original exit point, which requires several time-domain simulations (to obtain the CCT), we have also shown in [4] that the energy value at controlling unstable equilibrium point (CUEP) gives accurate critical energy value. It is hence important to verify that the computed UEP by a method, such as BCU method, is indeed the controlling UEP that lies on the stability boundary of the post-fault power system. We note that the CUEP is the UEP on the stability boundary of the post-fault power system whose stable manifold intersects with the fault-on trajectory.

As shown earlier, if the boundary condition of a computed UEP is violated, then the computed UEP does not lie on the stability boundary of the original (post-fault) system. It is hence inappropriate to use the energy value at the computed UEP as the critical energy. The issue then becomes how to find a point whose energy value can be used as a critical energy when the boundary condition is violated. In this invention, we develop a BCU-Exit point method to address this issue.

One major design goal of BCU-Exit point method is to resolve problems (P1) and (P2) stated earlier and to reach the following situations (S1) the BCU-Exit point method gives no over-valued energy margins; in other words, the BCU-Exit point method does not classify unstable contingencies as stable.

(S2) the BCU-Exit point method calculates less conservative energy margins than that calculated by the BCU method BCU-Exit Point Method All of the computed UEPs that violate the boundary condition share one common property—they do not lie on the stability boundary, instead they lie outside the stability region, of the corresponding post-fault SEP. The energy value at the computed UEP can not be used as the critical energy. Under this situation, we propose to compute the BCU-Exit point and use its energy value as the critical energy.

We next define the BCU-Exit point. Consider a computed UEP (by the BCU method), relative to a contingency, that violates the boundary condition. We draw a ray connecting the corresponding post-fault SEP and the computed UEP. Since the computed UEP lies outside the stability region, the ray will intersect with the stability boundary of the post-fault SEP. The first intersecting point along the ray starting from the SEP is termed the BCU-exit point. If the computed UEP satisfies the boundary condition, then the BCU-exit point is the computed UEP itself.

The BCU-Exit point plays an important role in the development of BCU-Exit point method. It also plays an important role in the development of Group-based BCU-Exit point method which determines an accurate critical energy value for each contingency in a coherent group of contingencies which violate the boundary condition.

Note that if the boundary distance of a computed UEP is less than 1.0, then the computed UEP lies outside the stability boundary and the potential energy at the computed UEP can not be used as a critical energy. We next present BCU-Exit point method for computing an accurate critical energy for every contingency, for which the computed UEP by the BCU method violated the boundary condition. For the BCU-Exit point method o be of practical use, the following criterion must be met:

(C1): the computed energy margin is always conservative but not too conservative, in comparison with the exact energy margin.

The above criterion (C1) follows the spirit of direct methods in general and the spirit of controlling UEP method in particular.

We consider a power system under a study contingency. The following BCU-exit point method computes an accurate critical energy for the study contingency BCU-Exit Point Method Given: a power system transient stability model, a study contingency and an energy function for the post-fault power system model Step 1. Use the BCU method to compute the CUEP and the post-fault SEP of the study contingency Step 2. Apply the verification procedure to the computed CUEP in Step 1. If the boundary condition is satisfied, then the critical energy value of the study contingency is the energy value at the computed CUEP and go to Step 4; otherwise, go to next step Step 3. Apply an effective time-domain-based method to compute the corresponding BCU-Exit point. The critical energy value of the study contingency is the energy value at the BCU-Exit point.

Step 4. Based on the critical energy value, perform a stability assessment and calculate the energy margin for the study contingency

TABLE 6

Evaluation of BCU-Exit Point Method on several contingencies against the critical energy based on exact time-domain simulation

| Case Number | Boundary Distance | SEP Separation | Critical Energy Based on | |
|---|---|---|---|---|
| | | | Time Domain Method | BCU-Exit Point Method |
| 626 | 0.814 | 10.871 | 0.358 | 0.357 |
| 642 | 0.814 | 10.879 | 0.358 | 0.357 |
| 31 | 0.814 | 10.989 | 0.358 | 0.355 |
| 16 | 0.813 | 14.823 | 0.297 | 0.295 |
| 15 | 0.813 | 14.823 | 0.296 | 0.295 |
| 18 | 0.812 | 14.835 | 0.297 | 0.295 |
| 17 | 0.812 | 14.835 | 0.298 | 0.295 |

Numerical Studies

We next show via numerical studies of a practical power system model that BCU-Exit point method meets the criterion (C1). We list the numerical simulation results in Table 6 which contains 5 columns; the first column lists the number of contingencies while the second lists the boundary distance of each computed UEP associated with each contingency of column one. It is clear from the boundary distance values that all the computed UEPs do not satisfy the boundary condition. Hence, the energy value at the computed UEP cannot be used as a critical energy. Instead, the energy value at the BCU-Exit point can be used as a critical energy value. The third column lists the SEP separation associated with each contingency. We make a comparison between the critical energy values based on the BCU-Exit point method and that based on the exact time-domain method (a bench-mark method) and focus on the computed energy margins by these two methods. For each study contingency, we compute the exact energy margin by performing iterative time-domain simulations. We employ the Golden bisection method in the iterative time-domain simulations to determine critical clearing time (in the time-domain); i.e. the exact exit point (the (first) intersection point between the stability boundary and the fault-on trajectory). The energy value of the exact (original) exit point is the exact critical energy. The critical energy value by the exact time domain method is listed in fourth column of the table while the critical energy value by the BCU-Exit point method is listed in fifth column.

We have observed from several numerical simulations including those summarized in Table 6 that for every study contingency, the energy value at the BCU-Exit point is slightly less than the exact critical energy. Hence, the criterion (C1) is met on this test system; more specifically, The energy value at the BCU-Exit point is always less than the energy value at the critical clearing time point (i.e. the exact critical energy). This indicates that the BCU-Exit point method is, following the spirit of controlling UEP method, conservative in stability assessments.

The energy value at the BCU-Exit point is always close to the energy value at the critical clearing time point (i.e. the exact critical energy). This indicates that the BCU-Exit point method is, following the spirit of controlling UEP method, accurate and yet not too conservative in stability assessments.

5.4 Group of Coherent Contingencies

In this invention, we develop, among others, the concept of group of coherent contingencies and explore several properties within the group of coherent contingencies. We strongly believe that the concept of coherent contingencies will prove useful not only in the development of the group-based BCU method but also in several applications such as contingency analysis, corrective control and preventive control.

We discover that the UEPs computed by the BCU method with respect to a group of contingencies tend to be close to each other. These UEPs are close to each other in the state space while the fault locations of the group of contingencies are close to each other in the geographical space. This group of contingencies is referred to as a group of coherent contingencies. We also discover that a list of contingencies can be classified into groups of coherent contingencies. Some groups may contain a large number of contingencies while others may contain a small number of contingencies.

Before proceeding to the discussion of the group of coherent contingencies, some definitions and terminologies will be presented next.

Definition: (Contingency List)

For a given power system dynamic model, the entire group of contingencies (say L) to be studied by a dynamic security assessment (DSA) program in one execution is said to form a contingency list.

For each contingency, we can compute its pre-fault SEP and post-fault SEP. We define the SEP separation of a contingency as follows:

Definition: (SEP Separation)

Given a contingency, we define the SEP separation of the contingency as the infinite-norm between its pre-fault SEP, say $\delta_s^{pre}$, and its post-fault SEP, say $\delta_s^{post}$, i.e.

$$SEP \text{ Separation} = \|\delta_s^{pre} - \delta_s^{post}\|_\infty.$$

Definition: (Coherent Contingencies)

Two contingencies are said to be coherent if the generator rotor angles at their corresponding computed SEPs and computed UEPs are close to each other. Mathematically speaking, we say contingency i and contingency j are coherent contingencies if the following condition are satisfied:

$$\|\delta_i^{cuep} - \delta_j^{cuep}\|_\infty < \epsilon^{cuep}$$

$$\|\delta_i^{sep} - \delta_j^{sep}\|_\infty < \epsilon^{sep}$$

where (i) $\delta_i^{sep}$ and $\delta_j^{sep}$ are the generator rotor angle vectors of the post-fault SEPs for contingency i and contingency j respectively, and $\epsilon^{sep}$ is a specified angle tolerance.

(ii) $\delta_i^{cuep}$ and $\delta_j^{cuep}$ are the generator rotor angle vectors of the computed UEPs for contingency i and contingency j respectively, and $\epsilon^{cuep}$ is a specified angle tolerance.

Note that the norm used in this definition is the infinite norm. Hence, this definition is valid for both large and small power systems.

Definition: (Group of Coherent Contingencies)

A Group of Coherent Contingencies is a subset of the contingency list, in which any two contingencies in the group are coherent.

Note that the number of contingencies contained in each group of coherent contingencies may be large or small, and the smallest group may contain only one contingency.

The SEP separation can be viewed as a measure of the static severity of a contingency. The 'separation' between the computed UEP and the post-fault SEP of a contingency can be viewed as a measure of the dynamic severity of a contingency. We define these two measures and apply them to develop schemes for grouping the list of contingencies into groups of coherent contingencies.

We have observed in our numerical studies that within each group of coherent contingencies, the UEP with the greatest SEP separation and the UEP with the smallest SEP separation define the boundary property for all UEPs in the group; more specifically, we have observed that the following group properties:

Group Property 1: If both the UEP with the largest SEP separation and the UEP with the smallest SEP separation satisfy the boundary property, then each UEP of the entire coherent group lies on the stability boundary of the corresponding original system. In other words, if the UEPs at 'both ends' of the coherent group lie on the stability boundary of the corresponding original system, then the UEPs of the entire group also lie on the stability boundary of the original system.

Group Property 2: If both the UEP with the largest SEP separation and the UEP with the smallest SEP separation do not satisfy the boundary property, then the UEPs of the entire group do not lie on the stability boundary of the original system.

Group property 1 can be expressed as follows if the difference between the largest SEP separation and the smallest SEP separation is small:

Group Property 1-A: If the UEP with the largest SEP separation satisfies the boundary property, then each UEP of the entire coherent group lies on the stability boundary of the corresponding original system.

Group property 2 can be expressed as follows if the difference between the largest SEP separation and the smallest SEP separation is small:

Group Property 2-A: If the UEP with the largest SEP separation does not satisfy the boundary property, then each UEP of the entire coherent group does not lie on the stability boundary of the corresponding original system.

We develop the following guideline for re-grouping a group of coherent contingencies into several groups of coherent contingencies so that Property 1 and Property 2 are satisfied.

Guideline for re-grouping: If one of the two UEPs, either the UEP with the largest SEP separation or the UEP with the smallest SEP separation, satisfies the boundary property while the other does not, then some UEPs of the entire coherent group satisfy the boundary property while the others do not.

Given a contingency list, we apply the BCU method to compute the controlling UEP for each contingency in the contingency list. We then group all the contingencies in the contingency list into groups of coherent contingencies based on the difference between the coordinates of the computed UEP and their SEP separations. Several grouping schemes can be developed; however, they should satisfy Property 1 and Property 2.

Numerical Studies

We have observed, through our intensive numerical simulations, that the UEPs computed by the BCU method with respect to a group of contingencies tend to be close to each other in the state-space of the post-fault system. We will verify the concept of groups of coherent contingencies through numerical studies on several test systems with detailed generator models.

We present simulation results of the application of the BCU method to a contingency list on a test system with detailed generator models. All of the contingencies in the list are then classified into groups of coherent contingencies based on the computed UEPs and the associated SEP separation. The numerical simulations indicate that the contingency list contains groups of coherent contingencies; some of them are large; for example, Group #4 contains 43 coherent contingencies, while some groups contain only one contingency. In Table 7 we list the group number and the number of coherent contingencies in each coherent group which has more than 3 contingencies.

We list the contingencies in several groups of coherent contingencies along with the boundary distance of each contingency in the group (see Table 8 to Table 15). It should be noted that the boundary distance of every contingency in the group of coherent contingencies is close to each other. In addition, if the boundary distance is exact (i.e. 1.0), then the boundary property is satisfied.

We discover that, our invented concept, definition of group of coherent contingencies enable the boundary property to be a group property for groups of coherent contingencies.

TABLE 7

The number of contingencies in each group of coherent contingencies.

| Group Number | Number of Coherent Contingencies |
|---|---|
| 1 | 25 |
| 2 | 27 |
| 3 | 11 |
| 4 | 43 |
| 5 | 10 |
| 6 | 3 |
| 7 | 10 |
| 8 | 6 |
| 9 | 4 |
| 10 | 3 |
| 11 | 9 |
| 12 | 23 |
| 13 | 6 |
| 14 | 6 |
| 15 | 3 |
| 16 | 3 |
| 17 | 6 |
| 18 | 3 |
| 19 | 3 |
| 20 | 5 |
| 21 | 15 |
| 22 | 15 |
| 23 | 3 |
| 24 | 7 |
| 25 | 3 |
| 26 | 9 |
| 27 | 3 |
| 28 | 8 |
| 29 | 9 |
| 30 | 3 |
| 31 | 15 |
| 32 | 5 |

TABLE 8

The boundary distance of some coherent contingencies in group 1

| | Case No. | | | | | | | | | | | |
|---|---|---|---|---|---|---|---|---|---|---|---|---|
| | 537 | 530 | 529 | 294 | 293 | 10 | 9 | 541 | 578 | 533 | 130 | 6 |
| Boundary Distance | 0.612 | 0.612 | 0.612 | 0.612 | 0.612 | 0.612 | 0.612 | 0.612 | 0.612 | 0.612 | 0.612 | 0.612 |

TABLE 9

The boundary distance of some coherent contingencies in group 2

| | Case No. | | | | | | | | | | | |
|---|---|---|---|---|---|---|---|---|---|---|---|---|
| | 714 | 690 | 689 | 682 | 554 | 553 | 306 | 305 | 202 | 201 | 194 | 198 |
| Boundary Distance | 0.310 | 0.310 | 0.310 | 0.310 | 0.310 | 0.310 | 0.310 | 0.310 | 0.310 | 0.310 | 0.309 | 0.309 |

TABLE 10

The boundary distance of all coherent contingencies in group 5

| | Case No. | | | | | | | | | |
|---|---|---|---|---|---|---|---|---|---|---|
| | 513 | 286 | 285 | 61 | 510 | 509 | 406 | 405 | 230 | 229 |
| Boundary Distance | Exact | Exact | Exact | Exact | Exact | Exact | Exact | Exact | Exact | Exact |

TABLE 11

The boundary distance of all coherent contingencies in group 11

| Case No. | | | | | | | | |
|---|---|---|---|---|---|---|---|---|
| 597 | 86 | 85 | 605 | 82 | 90 | 89 | 434 | 433 |
| Boundary Distance | | | | | | | | |
| Exact | Exact | Exact | Exact | Exact | Exact | Exact | Exact | Exact |

TABLE 12

The boundary distance of some coherent contingencies in group 21

| Case No. | | | | | | | | | | | |
|---|---|---|---|---|---|---|---|---|---|---|---|
| 722 | 721 | 390 | 389 | 354 | 353 | 118 | 117 | 718 | 717 | 650 | 649 |
| Boundary Distance | | | | | | | | | | | |
| 0.412 | 0.412 | 0.412 | 0.412 | 0.409 | 0.409 | 0.406 | 0.406 | 0.406 | 0.406 | 0.405 | 0.405 |

TABLE 13

The boundary distance of some coherent contingencies in group 12

| Case No. | | | | | | | | | | | |
|---|---|---|---|---|---|---|---|---|---|---|---|
| 545 | 302 | 301 | 138 | 137 | 222 | 221 | 166 | 165 | 134 | 150 | 149 |
| Boundary Distance | | | | | | | | | | | |
| 0.378 | 0.378 | 0.378 | 0.378 | 0.378 | 0.378 | 0.378 | 0.378 | 0.378 | 0.378 | 0.378 | 0.378 |

TABLE 14

The boundary distance of all coherent contingencies in group 13

| Case No. | | | | | |
|---|---|---|---|---|---|
| 186 | 193 | 677 | 177 | 181 | 173 |
| Boundary Distance | | | | | |
| 0.234 | 0.234 | 0.234 | 0.234 | 0.234 | 0.234 |

TABLE 15

The boundary distance of all coherent contingencies in group 32

| Case No. | | | | |
|---|---|---|---|---|
| 382 | 381 | 706 | 705 | 702 |
| Boundary Distance | | | | |
| Exact | Exact | Exact | Exact | Exact |

Some observations drawn from our numerical studies are presented below:

Observation 1: The boundary distances of the UEPs computed by the BCU method in each group of coherent contingencies are close to each other.

Observation 2: For groups of coherent contingencies, if the UEP computed by the BCU method with respect to a contingency in a group of coherent contingencies lies on the stability boundary of the original system (i.e. it satisfies the boundary condition), then the UEP computed by the BCU method with respect to any other contingency in the same group of coherent contingencies also lies on the stability boundary of the original system; in other words, the boundary property is a group property.

Observation 3: The single-swing stability/instability phenomenon is a group property of coherent contingencies.

Observation 4: The multi-swing stability/instability phenomenon is a group property of coherent contingencies.

5.5 Group-based Verification Schemes

The procedure of checking whether or not a UEP lies on the stability boundary of the original (post-fault) system is rather time-consuming. In this invention, we develop an effective numerical procedure for checking whether or not each computed UEP (relative to a contingency) in a coherent group lies on the stability boundary of its corresponding original (post-fault) system. In particular, we develop in this invention a group-based procedure to check the boundary property for a group of coherent contingencies.

A Group-Based Verification Procedure

Step 0: Given a group of coherent contingencies.

Step 1. (Selection Step)

For the group of coherent contingencies, we propose the following criterion to select one contingency or two contingencies from the group of coherent contingencies for the verification of boundary property. If the SEP separation of each contingency in the coherent contingencies is small, say less than 3 degrees, then the computed UEP with the largest SEP separation in the group is selected; otherwise, the computed UEP with the largest SEP separation and the one with the smallest SEP separation in the group are selected.

Step 2. (Checking Step)

Check the boundary condition of the computed UEP(s) which correspond to the selected contingency in the selection step. We compute a test vector for each selected UEP, say $X^{UEP}$, using the following equation $$X^{test} = X_s^{post} + 0.99(X^{UEP} - X_s^{post})$$

where $X_s^{post}$ is the post-fault SEP of the contingency which corresponds to $X^{UEP}$. The post-fault trajectory starting from $X^{test}$ is simulated and assessed. If the post-fault trajectory converges to $X_s^{post}$, then the selected UEP, $X^{UEP}$, satisfies the boundary condition; otherwise, it does not.

Step 3. (Assessment Step)

Based on the checking results of Step 2, the following assessment results are obtained.

(1) If the selected UEPs satisfy the boundary condition, then the computed UEPs of the coherent contingencies in the entire group lie on the stability boundary of the (original) post-fault system.

(2) If none of the selected UEPs satisfy the boundary condition, then the UEPs of the entire group lie outside the stability boundary of the (original) post-fault system.

The above group-based verification procedure is composed of three steps: selection step, checking step and assessment step. The major computational efforts required is in Step 2, in which one time-domain simulation result is performed to check the boundary condition. By checking the boundary condition, one can verify whether or not the UEP computed by BCU method lies on the stability boundary of the original (post-fault) system, without the need for checking the one-parameter transversality condition. Moreover, the above verification procedure eliminates the need of a complete check of the boundary condition for every contingency in each group of coherent contingencies.

5.6 Group-based BCU-Exit-point Method

We consider a power system with a study contingency. Suppose that the study contingency is numerically well conditioned in the BCU sense that the contingency passes the screening procedure of the improved BCU classifiers and the BCU method computes a UEP of the study contingency. The issue then becomes whether the computed UEP lies on the stability boundary of the post-fault system. To address this issue, the BCU-Exit point method, an extension of BCU method, includes an effective verification procedure to check the boundary condition and a corrective scheme of computing an accurate critical energy when the boundary condition is violated. In fact, the BCU-Exit point method gives accurate stability assessment and energy margin calculation of the study contingency regardless of the satisfaction of required boundary condition.

The computational effort required by the BCU-Exit point method however can be considerably greater than that in the BCU method. Hence, it is highly desirable to reduce the computational efforts required by the BCU-Exit point method. To improve upon the verification procedure, we develop in this invention a group-based verification procedure which only entails one or two time-domain simulations for each entire group of coherent contingencies; instead of one time-domain simulation for each contingency in the group. The speed-up offered by the group-based verification procedure is m or 0.5×m, where m is the number of contingencies in a coherent group.

We develop in this invention a group-based BCU-Exit point method by exploring some group properties to overcome the difficulty of computing the BCU-Exit point for each contingency in a coherent group. We develop a group-based corrective procedure for computing an accurate critical energy for each contingency without the need of computing the BCU-Exit point for each contingency in a coherent group. The group-based BCU-Exit point method only entails the computation of the BCU-Exit point of a (particular) contingency in a coherent group; hence the speed-up is roughly m, where m is the number of contingencies in the coherent group.

We next present the group-based BCU-Exit point method. We next consider a group of coherent contingencies which violate the boundary condition. Our goal is to determine an (accurate) critical energy for each contingency in the coherent group. Let $L_l$ be the contingency whose computed UEP, say $X_l^{UEP}$, has the largest SEP separation in the group. Let $L_s$ be the contingency whose computed UEP, say $X_s^{UEP}$, has the smallest SEP separation in the group. Since the boundary condition is a group property, every contingency in the coherent group violates the boundary condition.

Let the BCU-exit point of $X_l^{UEP}$ and $X_s^{UEP}$ be $X_l^{bcu}$ and $X_s^{bcu}$ respectively. We have the following discoveries:

The energy value at the BCU-Exit point $X_l^{bcu}$ can be used accurately as the critical energy value for the contingency $L_l$. On the other hand, the energy value at the computed UEP, $X_l^{UEP}$ cannot be used as the critical energy value for the contingency $L_l$.

The energy value at the BCU-Exit point $X_s^{bcu}$ can be used accurately as the critical energy value for the contingency $L_s$. On the other hand, the energy value at the computed UEP, $X_s^{UEP}$ cannot be used as the critical energy value for the contingency $L_s$.

We next move one further step by developing the following relationship that may hold for each coherent group of contingencies:

For each contingency in a coherent group, what is the relationship between the exact critical energy (i.e. the energy at the exit point) and its SEP separation?

For each contingency in a coherent group, what is the relationship between the energy at the BCU-exit point and its SEP separation?

We have the following discoveries

Within a group of coherent contingencies, there is a nonlinear relationship between its critical energy and its SEP separation.

Within a group of coherent contingencies, there is a nearly linear relationship between the energy at the BCU-Exit point and its SEP separation.

We next present a group-based BCU-Exit point method which explores the relationship between the energy at the BCU-Exit point and its SEP separation.

Group-based BCU-Exit Point Method

Figure 3:
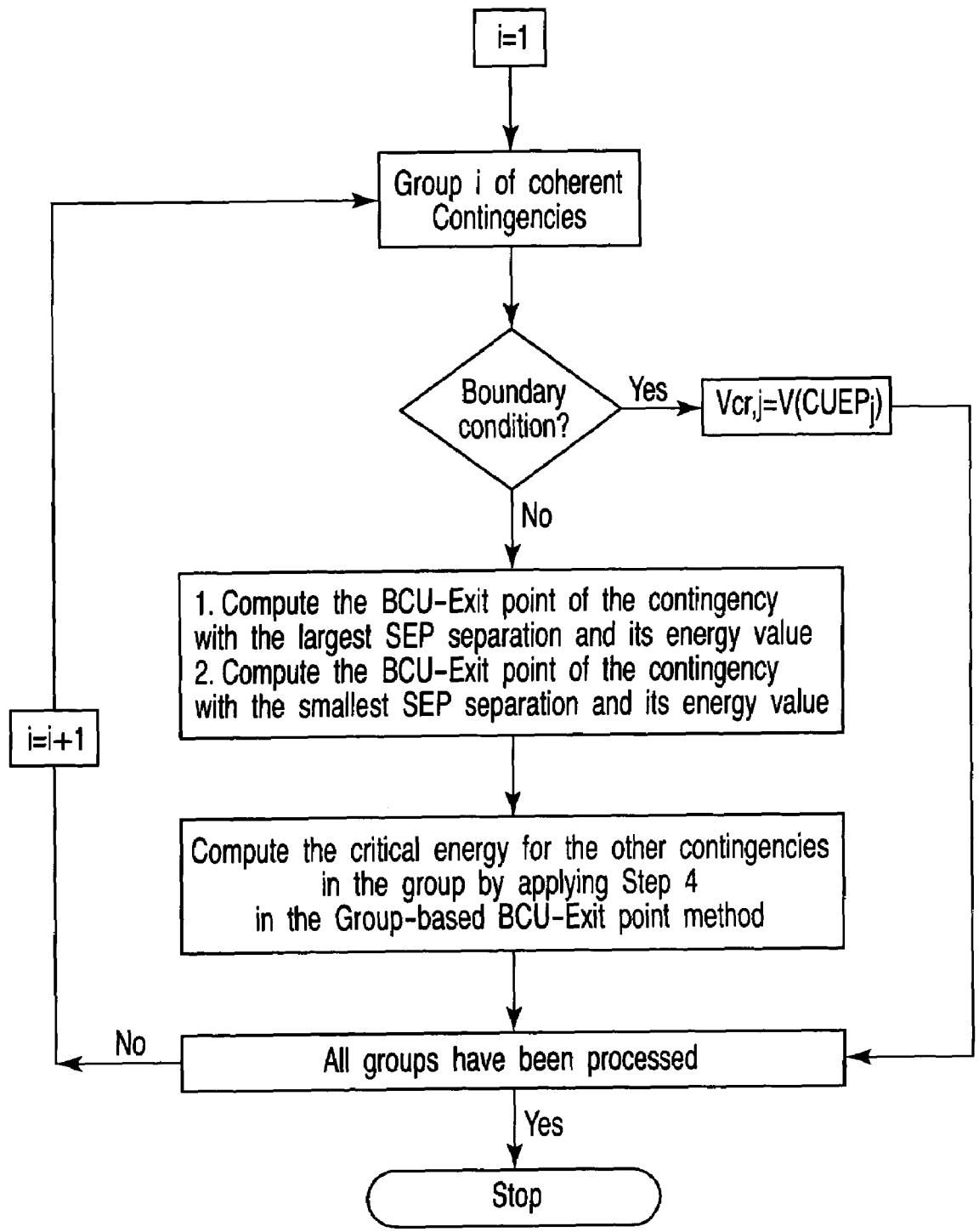
FIG. 3 is the flow chart of group-based BCU-Exit-point method.

Given a group of coherent contingencies which violate the boundary condition, we develop the following group-based BCU-Exit method which computes a critical energy for each contingency in the group. The flow chart of the group-based BCU-Exit method is then shown (See FIG. 3). FIG. 3 shows a flow chart of the group-based BCU-Exit point method in determining critical energy value for each group of coherent contingencies.

Group-based BCU-Exit Point Method

Given: a group of coherent contingencies which violates the boundary condition, the following steps determine a critical energy for each contingency in the coherent group.

Step 1. (Selection Step)

From the group of coherent contingencies, select the computed UEP which has the largest SEP separation, say $X_l^{UEP}$ with respect to contingency, say $L_l$, and select the computed UEP which has the smallest SEP separation, say $X_s^{UEP}$, with respect to contingency, say $L_s$.

Step 2. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 3. (Critical Energy)

Use the energy at $X_l^{bcu}$, denoted as $V_l^{bcu}$, as the critical energy for the contingency $L_s$. Likewise, use the energy at $X_s^{bcu}$, denoted as $V_s^{bcu}$, as the critical energy for the contingency $L_s$.

Step 4. (Critical Energy for the Other Contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

Numerical Studies

We evaluate the group-based BCU-Exit point method on a 134-machine system. For the purpose of evaluation, we compare two different methods for computing the critical energy

TABLE 16

Evaluation of the Group-based BCU-Exit point Method on a group of coherent contingencies against the critical energy based on exact time-domain simulation.

| | | | Critical Energy Based on | |
|---|---|---|---|---|
| Case Number | Boundary Distance | SEP Separation | Time-Domain Iterative Method | Group-based BCU-Exit Point Method |
| 1174 | 0.964 | 10.864 | 0.351 | 0.35 |
| 1173 | 0.964 | 10.864 | 0.351 | 0.35 |
| 1097 | 0.964 | 10.871 | 0.356 | 0.35 |
| 1171 | 0.964 | 10.929 | 0.353 | 0.349 |
| 1093 | 0.964 | 10.971 | 0.368 | 0.349 |
| 32 | 0.964 | 10.989 | 0.352 | 0.349 |
| 34 | 0.964 | 10.996 | 0.353 | 0.349 |
| 33 | 0.964 | 10.996 | 0.353 | 0.349 |
| 1095 | 0.964 | 11.026 | 0.365 | 0.348 |
| 1085 | 0.964 | 11.043 | 0.362 | 0.348 |
| 1087 | 0.964 | 11.044 | 0.362 | 0.348 |
| 1170 | 0.964 | 14.134 | 0.322 | 0.313 |
| 1169 | 0.964 | 14.134 | 0.322 | 0.313 |
| 8 | 0.964 | 15.621 | 0.309 | 0.296 |
| 7 | 0.964 | 15.6201 | 0.309 | 0.296 | exact critical energy by applying the time domain simulation to compute the critical clearing time
critical energy based on group-based BCU-Exit point method (G-BCU-Exit point method).

TABLE 17

Evaluation of the Group-based BCU-Exit Point Method on a group of coherent contingencies, which violates the boundary condition, against the critical energy based on exact time-domain simulation

| | | | Critical Energy Based on | |
|---|---|---|---|---|
| Case Number | Boundary Distance | SEP Separation | Time-Domain | Group-based Method |
| 626 | 0.814 | 10.871 | 0.358 | 0.357 |
| 642 | 0.814 | 10.879 | 0.358 | 0.357 |
| 31 | 0.814 | 10.989 | 0.358 | 0.355 |

TABLE 17-continued

Evaluation of the Group-based BCU-Exit Point Method on a group of coherent contingencies, which violates the boundary condition, against the critical energy based on exact time-domain simulation

| | | | Critical Energy Based on | |
|---|---|---|---|---|
| Case Number | Boundary Distance | SEP Separation | Time-Domain | Group-based Method |
| 16 | 0.813 | 14.823 | 0.297 | 0.295 |
| 15 | 0.813 | 14.823 | 0.296 | 0.295 |
| 18 | 0.812 | 14.835 | 0.297 | 0.295 |
| 17 | 0.812 | 14.835 | 0.298 | 0.295 |

We first evaluate the accuracy and reliability of group-based BCU-Exit point method. For the purpose of comparison, we compute the exact critical energy by using the time domain simulation to compute the critical clearing time the energy at which gives the exact critical energy. This is the most rigorous but time-consuming method. The Golden bisection method is employed in the time-domain simulation to determine the critical clearing time.

In Table 16, we list some groups' information, including case number, boundary distance, SEP separation, the critical energy by using the time domain simulation method and the critical energy based on G-BCU-Exit point method for a group of coherent contingencies. In Table 17, we list some groups' information, including case number, boundary distance, SEP separation, the critical energy by using the time domain simulation method and the critical energy based on G-BCU-Exit point method for a group of coherent contingencies, which violate the boundary condition. We have discovered the following The critical energy based on group-based BCU-Exit point method is always less than the exact critical energy. This is true for all the contingencies in the simulations. This indicates that the critical energy based on group-based BCU-Exit point method is conservative, following the spirit of CUEP method in direct stability assessment.

The critical energy based on group-based

BCU-Exit point method is always close to the exact critical energy. This is true for all the contingencies in the simulations. This indicates that the critical energy based on group-based BCU-Exit point method is accurate and not too conservative in direct stability assessment.

The critical energy based on G-BCU-Exit point method is always less than, but close to the critical energy based on BCU-Exit point method.

There is a rough linear relationship between the energy at BCU-Exit point and SEP separation for each group of coherent contingencies.

There is a nonlinear-linear relationship between the exact critical energy and SEP separation for each group of coherent contingencies.

However, BCU-Exit point method may not be suitable for on-line applications because the task of computing the BCU-Exit point for each contingency is very time consuming while G-BCU-Exit point method may prove to be effective for on-line applications.

5.7 Group-based BCU Method

We develop in this invention a group-based BCU method which incorporate the group-based verification scheme, the group-based BCU-Exit point method of this invention. The invented group-based BCU method can improve not only the reliability of BCU method but also the conservativeness of the BCU method in direct transient stability assessments.

Group-based BCU Method

Step 1. Use BCU method to compute the controlling UEP and the post-fault SEP of each study contingency of a contingency list until the contingency list is finished.

Step 2. (Grouping step) group the computed UEPs associated with each contingency into groups of coherent contingencies such that they satisfy Property 1 and Property 2.

For each group of UEPs, perform the following steps:

Step 3. (Selection step) If the SEP separation of each contingency in the group is small, say less than 3 degrees, then the UEP with the greatest SEP separation is selected; otherwise the UEP with the greatest SEP separation and the UEP with the smallest SEP separation are selected.

Step 4. (Checking step) Check the boundary property of the selected UEP(s). In practical implementation, we compute a test vector for each selected UEP, say $X^{UEP}$, using the following equation $$X^{test} = X_s^{post} + \alpha(X^{UEP} - X_s^{post})$$

where $\alpha<1$ is a positive number and close to 1.0, say for example 0.99, $X_s^{post}$ is the post-fault SEP of the contingency and $X^{UEP}$ is the selected UEP. The post-fault trajectory starting from $X^{test}$ is simulated and assessed. If the post-fault trajectory converges to $X_s^{post}$, then the selected UEP, $X^{UEP}$, satisfies the boundary property; otherwise, it does not.

Step 5. If the selected UEPs satisfy the boundary property, then the UEPs of the entire group lie on the stability boundary of the original system and go to Step 6. If none of the selected UEPs satisfy the boundary property, then the UEPs of the entire group lie outside the stability boundary and go to Step 7.

Step 6. The critical energy value of each study contingency in the groups of coherent contingencies is the energy value at the computed UEP and go to Step 11;

Step 7. Let the selected UEP which has the largest SEP separation be denoted as $X_l^{UEP}$ with respect to contingency, say $L_l$, and let the selected UEP which has the smallest SEP separation be denoted as $X_s^{UEP}$, with respect to contingency, say $L_s$.

Step 8. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 9. (Critical Energy)

Use the energy at $X_l^{bcu}$, denoted as $V_l^{bcu}$, as the critical energy for the contingency $L_l$. Likewise, use the energy at $X_s^{bcu}$, denoted as $V_s^{bcu}$, as the critical energy for the contingency $L_s$.

Step 10. (Critical energy for the other contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

Step 11. Based on the critical energy, perform a direct stability assessment and calculate the energy margin for each study contingency in the group of coherent contingencies.

5.8 Revised BCU Classifiers

The revised BCU classifiers are built on the improved BCU classifiers of the invention [3] The main design goal of the revised BCU classifiers is to ensure that all five requirements for on-line dynamic contingency screening described in [3] are met.

Input: a power system model with related data for dynamic security assessment and a study contingency.

Output: stability assessment and energy margin value for the contingency on the power system.

Figure 4:
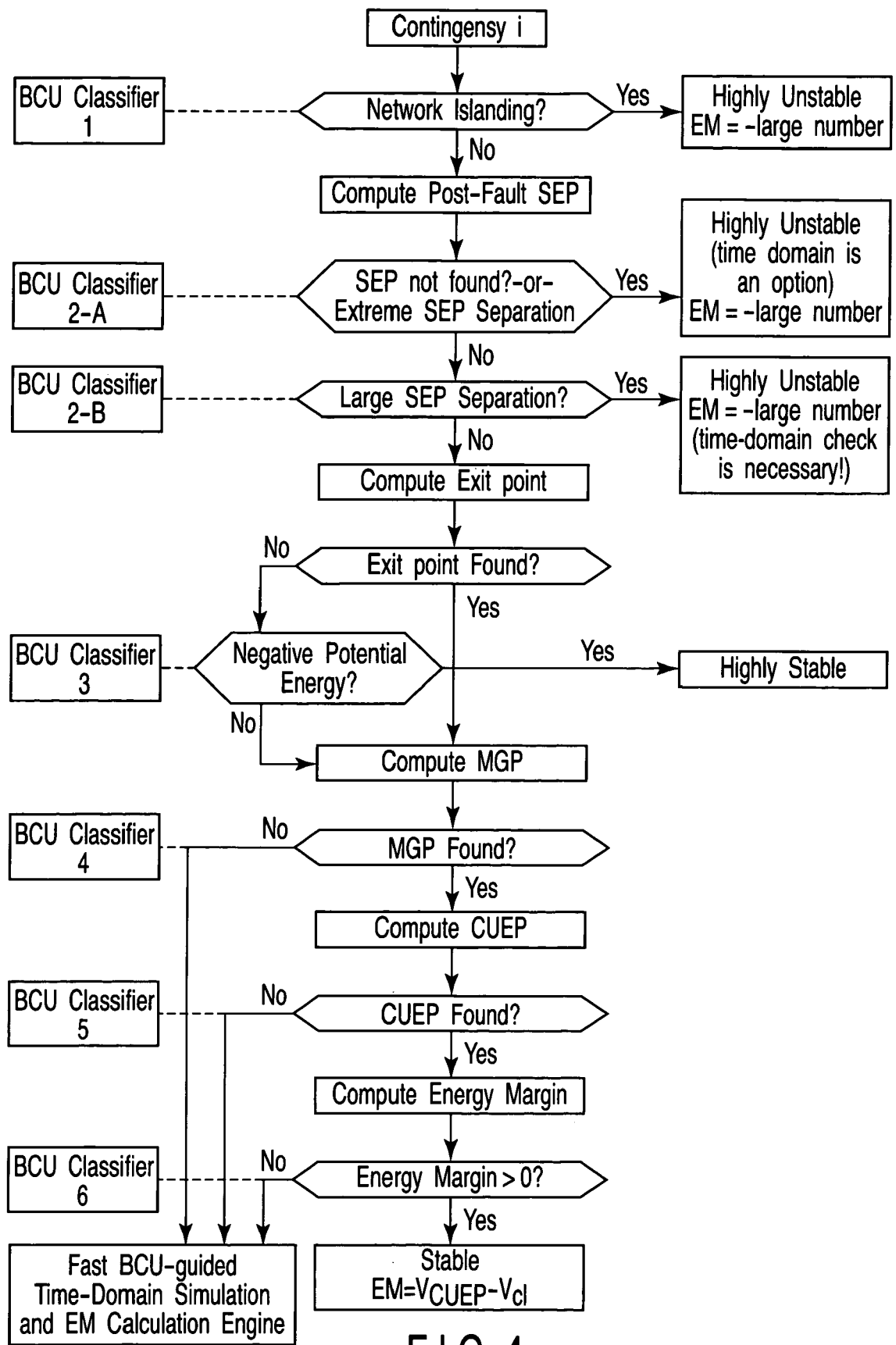
FIG. 4 is the computation flow of stability analysis and energy margin calculation of a contingency via the revised BCU classifiers and the BCU-guided time-domain simulation and energy margin calculation engine in a sequential manner.

The revised BCU Classifiers are executed in the following steps (see FIG. 4): FIG. 4 shows computation flow of stability analysis and energy margin calculation of a contingency via the revised BCU classifiers and the BCU-guided time-domain simulation and energy margin calculation engine in a sequential manner.

Step 1. BCU Classifier I: When a contingency is sent to the revised BCU Classifiers, the program first checks BCU classifier I which is a classifier for detecting the problem of network islanding. If BCU classifier I is triggered, then the power system is separated into several parts caused by the contingency and hence, the power system under the contingency is considered highly unstable and a large negative energy margin, say −999 is assigned to the study contingency and stop the procedure; otherwise, the study contingency is sent to BCU classifier II.

Step 2. BCU Classifier II-A and BCU Classifier II-B: The post-fault SEP under the study contingency is computed. If no post-fault SEP is found or a post-fault SEP is found but it is too far away from pre-fault SEP, then Classifier 2-A is triggered and the study contingency is assessed highly unstable and a large negative energy margin, say −999 is assigned to the study contingency and stop the procedure; otherwise, if the post-fault SEP is moderately far away from the pre-fault SEP, the Classifier 2-B is triggered and the study contingency is still considered as highly unstable, but a time-domain is needed to verify the preliminary assessment. If it is indeed unstable, then a large negative energy margin, say −999 is assigned to the study contingency and stop the procedure; otherwise, the study contingency is sent to BCU classifier III.

Step 3. BCU Classifier III: The exit point is computed. If an exit point is not found within a specified period and the potential energy at the end point of the specified period is non-positive, then BCU classifier III is triggered. the study contingency is assessed as highly stable; then a large energy margin, say 999 is assigned to the study contingency and stop the procedure; otherwise, the study contingency is sent to BCU classifier IV.

Step 4. BCU Classifier IV: The Minimal Gradient Point (MGP) is computed. If the procedure of ray adjustment fails or a MGP point can not be found within a specified number of steps in ray adjustment, then BCU Classifier IV is triggered and the study contingency is sent to the BCU-guided time-domain simulation engine for stability assessment and energy margin calculation and stop the procedure; otherwise, the study contingency is sent to BCU classifier V.

Step 5. BCU Classifier V: The Controlling UEP is computed. If a Controlling UEP can not be found, then BCU Classifier V is triggered and the study contingency is sent to he BCU-guided time-domain simulation engine for stability assessment and energy margin calculation and stop the procedure; otherwise, the study contingency is sent to BCU classifier VI.

Step 6. BCU Classifier VI: The energy margin is computed based on the energy value at the computed Controlling UEP. If the energy margin is positive, then the study contingency is assessed as stable; otherwise, the study contingency is assessed as unstable. The procedure is completed.

Step 6 of the revised BCU classifiers can be modified so as to improve the conservative nature of the BCU method as described in the following Step 7. BCU Classifier VI: The energy margin is computed based on the energy value at the computed Controlling UEP. If the energy margin is negative, then this case is assessed as unstable and a time-domain simulation engine is needed to verify the assessment. When the assessment is reversed by the time-domain engine, then its energy margin is recalculated using the BCU-guided time-domain calculation engine. If the energy margin is positive, then the corresponding energy margin and stability assessment is kept unchanged and stop the procedure.

The revised BCU classifiers described above is built on the improved BCU classifiers of the invention [3]. Indeed, BCU classifier I of the revised BCU classifiers is the same as BCU classifier I of the improved BCU classifiers and the other BCU classifiers are revised version of the improved BCU classifiers. The BCU-guided time-domain simulation engine used in the revised BCU classifiers was developed in the invention [3].

5.9 Group-based BCU-DSA

Figure 5:
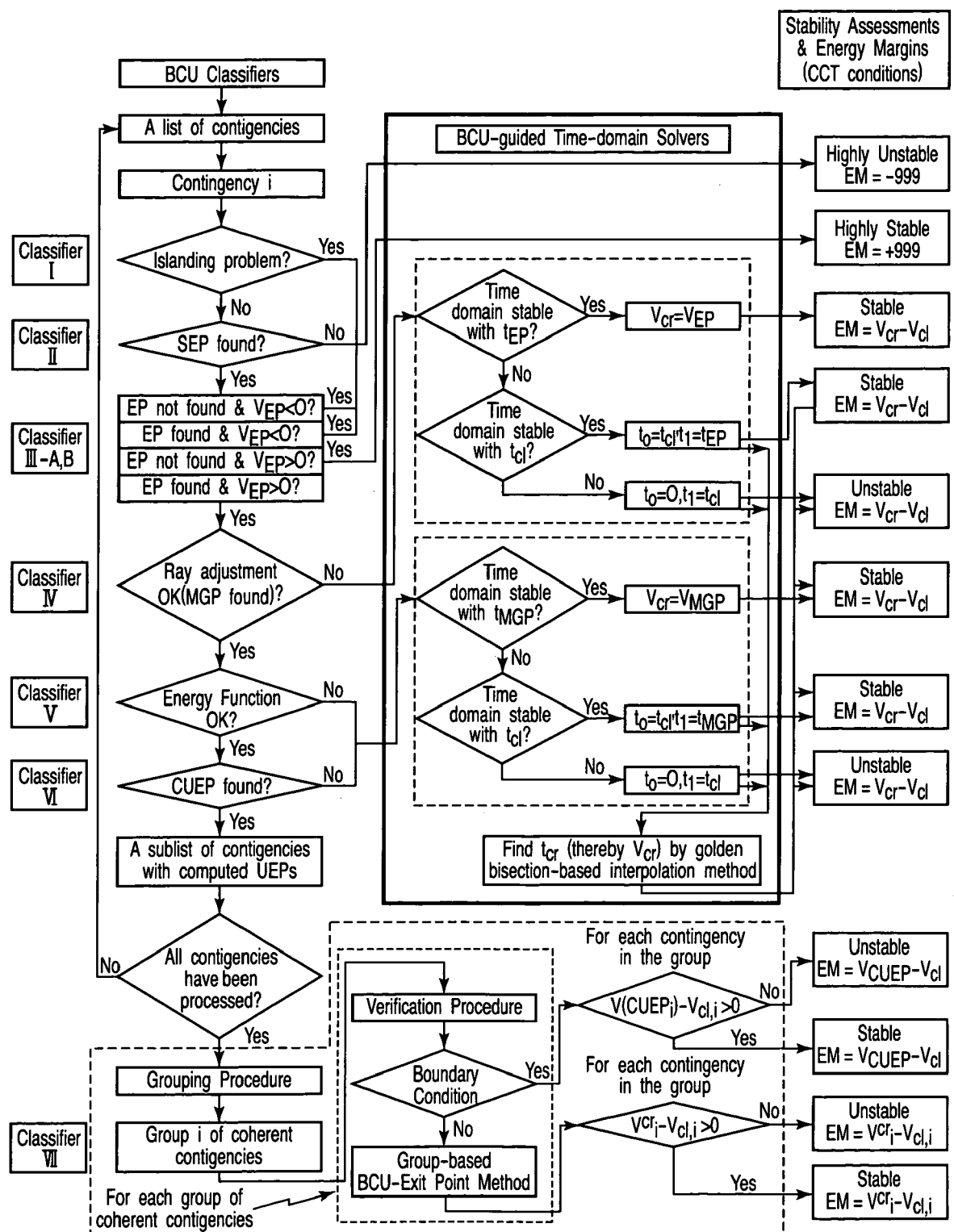
FIG. 5 is the flow chart of the group-based BCU-DSA system (version I).

This invention develops a novel system, the group-based BCU-DSA system, for on-line dynamic security assessment and energy margin calculation of practical power systems. The group-based BCU-DSA system is composed of three major sub-systems:

(1) a revised BCU classifiers
(2) a BCU-guided time-domain simulation program
(3) a group-based BCU method We design a group-based BCU-DSA system, based on BCU-DSA, the group-based verification procedure, and on the group-based BCU-Exit point method. The architecture of G-BCU-DSA system (version I) is shown in FIG. 5. The revised BCU classifiers are built on the improved BCU classifiers of the invention [3] while the BCU-guided time-domain simulation program was developed in the invention [3]. The group-based BCU method is developed in this invention. The main design goal of the revised BCU classifiers is to ensure that all five requirements for on-line dynamic contingency screening described in [3] are met.

The present invention provides a novel system, Group-based BCU-DSA, for performing on-line dynamic security assessment and energy margin calculations of practical power systems. The architecture of Group-based BCU-DSA is comprised of three major components: a dynamic contingency classification program made up of eight revised BCU classifiers and a BCU-guided time-domain simulation program and group-based BCU method. When a new cycle of DSA is warranted, a list of credible contingencies along with information from the state estimator and topological analysis are first applied to the revised BCU classifiers whose basic function is to screen out contingencies which are either potentially unstable or definitely stable. Contingencies which are classified as definitely stable by the revised BCU classifiers are assigned an energy function value and then eliminated from further stability analysis. Contingencies which are identified as potentially unstable are then sent to the BCU-guided time-domain simulation program for further stability analysis and energy margin calculation.

Version I of group-based BCU-DSA system is executed in the following steps

Input: a power system model with related data for dynamic security assessment and a list of credible contingencies.

Output: stability assessment (i.e. stable or unstable), energy margin value, and estimated critical clearing time for each contingency of the list of credible contingencies.

Each contingency is executed in the following steps:

Step 0: Input each contingency of the list of credible contingencies sequentially Revised BCU classifiers and BCU-guided time-domain program:

Step 1. BCU Classifier I: When a contingency is sent to the revised BCU Classifiers, the program first checks BCU classifier I which is a classifier for detecting the problem of network islanding. If BCU classifier I is triggered, then the power system is separated into several parts caused by the contingency and hence, the power system under the contingency is considered highly unstable and a large negative energy margin, say −999 is assigned to the study contingency, the estimated critical clearing time is zero and go to Step 0; otherwise, the study contingency is sent to BCU classifier II.

Step 2. BCU Classifier II-A and BCU Classifier II-B: The post-fault SEP under the study contingency is computed. If no post-fault SEP is found or a post-fault SEP is found but it is too far away from pre-fault SEP, then Classifier 2-A is triggered and the study contingency is assessed highly unstable and a large negative energy margin, say −999 is assigned to the study contingency, the estimated critical clearing time is zero and go to Step 0; otherwise, if the post-fault SEP is moderately far away from the pre-fault SEP, the Classifier 2-B is triggered and the study contingency is still considered as highly unstable, but a time-domain is needed to verify the preliminary assessment. If it is indeed unstable, then a large negative energy-margin, say −999 is assigned to the study contingency, the estimated critical clearing time is zero and go to Step 0; otherwise, the study contingency is sent to BCU classifier III.

Step 3. BCU Classifier III: The exit point is computed. If an exit point is not found within a specified period and the potential energy at the end point of the specified period is non-positive, then BCU classifier III is triggered. the study contingency is assessed as highly stable; then a large energy margin, say 999 is assigned to the study contingency, the estimated critical clearing time is termed very large and go to Step 0; otherwise, the study contingency is sent to BCU classifier IV.

Step 4. BCU Classifier IV: The Minimal Gradient Point (MGP) is computed. If the procedure of ray adjustment fails or a MGP point can not be found within a specified number of steps in ray adjustment, then BCU Classifier IV is triggered and the study contingency is sent to the BCU-guided time-domain simulation engine for stability assessment and energy margin calculation and output the critical clearing time based on the energy margin and the energy along the fault-on trajectory, and go to Step 0; otherwise, the study contingency is sent to BCU classifier V.

Step 5. BCU Classifier V: The Controlling UEP is computed. If a Controlling UEP can not be found, then BCU Classifier V is triggered and the study contingency is sent to he BCU-guided time-domain simulation engine for stability assessment and energy margin calculation and output the critical clearing time based on the energy margin and the energy along the fault-on trajectory, and go to Step 0; otherwise, the study contingency is sent to BCU classifier VI.

Group-based BCU Method

Step 6. Store the computed UEP and the post-fault SEP of each study contingency that sent to this step. Check whether or not the contingency list is finished. If the contingency list is finished, then go to next Step; otherwise, go to Step 0.

Step 7. (Grouping step) group the computed UEPs associated with each contingency into groups of coherent contingencies such that they satisfy Property 1 and Property 2.

For each group of computed UEPs, perform the following steps until all the groups of coherent contingencies are executed:

Step 8. (Selection step) If the SEP separation of each contingency in the group is small, say less than 3 degrees, then the UEP with the greatest SEP separation is selected; otherwise the UEP with the greatest SEP separation and the UEP with the smallest SEP separation are selected.

Step 9. (Checking step) Check the boundary property of the selected UEP(s). In practical implementation, we compute a test vector for each selected UEP, say $X^{UEP}$, using the following equation $$X^{test} = X_s^{post} + \alpha(X^{UEP} - X_s^{post})$$

where $\alpha<1$ is a positive number and close to 1.0, say for example 0.99, $X_s^{post}$ is the post-fault SEP of the contingency and $X^{UEP}$ is the selected UEP. The post-fault trajectory starting from $X^{test}$ is simulated and assessed. If the post-fault trajectory converges to $X_s^{post}$, then the selected UEP, $X^{UEP}$, satisfies the boundary property; otherwise, it does not.

Step 10. If the selected UEPs satisfy the boundary property, then the UEPs of the entire group lie on the stability boundary of the original system and go to Step 11. If none of the selected UEPs satisfy the boundary property, then the UEPs of the entire group lie outside the stability boundary and go to Step 12.

Step 11. The critical energy value of each study contingency in the groups of coherent contingencies is the energy value at the computed UEP and go to Step 16;

Step 12. Let the selected UEP which has the largest SEP separation be denoted as $X_l^{UEP}$ with respect to contingency, say $L_l$, and let the selected UEP which has the smallest SEP separation be denoted as $X_s^{UEP}$, with respect to contingency, say $L_s$.

Step 13. (BCU-Exit Point)

Compute the corresponding BCU-Exit point for $X_l^{UEP}$ and $X_s^{UEP}$ respectively. Let them be denoted as $X_l^{bcu}$ and $X_s^{bcu}$ respectively.

Step 14. (Critical Energy)

Use the energy at $X_l^{bcu}$, denoted as $V_l^{bcu}$, as the critical energy for the contingency $L_s$. Likewise, use the energy at $X_s^{bcu}$, denoted as $V_l^{bcu}$, as the critical energy for the contingency $L_s$.

Step 15. (Critical energy for the other contingencies)

Let the SEP separation of a contingency, say $L_i$, in the group of coherent contingencies be $SEP_i$. Then the critical energy for the contingency $L_i$ is $$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

Step 16. Based on the critical energy, perform a direct stability assessment and calculate the energy margin and output the critical clearing time based on the energy margin and the energy along the fault-on trajectory for each study contingency in the group of coherent contingencies.

The group-based BCU-DSA (version I) system is designed to perform on-line dynamic security assessment for each contingency of practical power systems with the following properties:

[1] If the transient stability energy margin of a contingency is greater than zero, then the post-contingency power system is guaranteed to be stable with respect to the provided data and model (for transient stability study)

[2] If the transient stability energy margin of a contingency is less than zero and is not calculated by group-based BCU method, then the post-contingency power system is guaranteed to be unstable with respect to the provided data and model (for transient stability study)

[3] If the transient stability energy margin of a contingency is less than zero and is calculated by group-based BCU method, then the post-contingency power system may be unstable with respect to the provided data and model (for transient stability study)

Property [3] indicates that conservative stability assessments of these contingencies which are characterized by this property. However, compared with the BCU-DSA system developed in the invention [3], the group-based BCU-DSA system (version I) is significantly enhanced in Property [3] in the sense that the number of contingencies with conservative stability assessment is reduced; furthermore, the group-based BCU-DSA system (version I) always possesses Property [1] and Property [2].

To improve the property [3] of the grouped-based BCU-DSA system (version I), the group-based BCU-DSA system (version II) is designed to compute the transient stability energy function and the estimated critical clearing time for each contingency of practical power systems with the following properties:

[1] If the transient stability energy margin of a contingency is greater than zero, then the post-contingency power system is guaranteed to be stable with respect to the provided data and model (for transient stability study)

[2] If the transient stability energy margin of a contingency is less than zero, then the post-contingency power system is guaranteed to be unstable with respect to the provided data and model (for transient stability study)

The group-based BCU-DSA system (version II) is executed in the same order of steps as the group-based BCU-DSA system (version I) except that Step 16 is extended as follows:

Step 16. Based on the critical energy, perform a direct stability assessment and calculate the energy margin and output the critical clearing time based on the energy margin and the energy along the fault-on trajectory for each study contingency in the group of coherent contingencies.

Step 17. For each group of coherent contingencies, if a contingency in the group is assessed as unstable, then go to Step 18; otherwise, check for the next group of coherent contingencies until all the groups of coherent contingencies have been checked.

Step 18. Perform a time-domain simulation of the corresponding post-fault system with the state at the fault-clearing time as the initial condition. If the post-fault trajectory is assessed as unstable, then the corresponding energy margin, stability assessment and estimated critical clearing time are kept unchanged; otherwise, it is a stable contingency and sent to the BCU-guided time-domain simulation for energy margin calculation and critical clearing time estimation. And go to Step 17.

The group-based BCU-DSA system (version II) is built on the group-based BCU-DSA system (version I) by modifying the output of BCU classifier VII such that all the contingencies classified as unstable by group-based BCU method are sent to BCU-guided time-domain engine for final verification of instability and, energy margin recalculation, if necessary.

We have evaluated the group-based BCU-DSA system (Version I) on two test power systems. These two test systems are a 116-machine test system and a 134-machine test system. The fault clearing time for the 116-machine system is set to be 0.09 sec. while the fault clearing time for the 134-machine system is set to be 0.07 sec. We summarize the dynamic security assessments and the grouping results in Table 18. We make the following observations.

The group property holds in all the test systems.

Given a list of credible contingencies, the number of groups of coherent contingencies is system-dependent, loading-dependent, contingency-dependent, among others.

The number of contingencies of the 116-machine and the 134-machine systems is 312 and 135 respectively. The biggest group of coherent contingencies for the former test systems contains more than 30 contingencies while the biggest group of coherent contingencies for the 134-machine test system contains only 6 contingencies.

There are several single-member groups which contain only one contingency. Among them, the 134-machine test system has 3 of single-member groups.

TABLE 18

Group properties and number of groups

| Testing System | Number of Tested Contingencies | Number of Groups of Coherent Contingencies | Number of Contingencies in the Biggest Group | Number of Single-member Groups |
|---|---|---|---|---|
| 116-machine system | 312 | 38 | 44 | 7 |
| 134-machine system | 135 | 29 | 6 | 3 |

It should be pointed out that the strategy of analyzing the single-member group is different from that of analyzing the multiple-member groups. A complete group-based analysis of single-member group for boundary distance calculation and critical energy calculation may not be necessary. We propose that the BCU-guided time-domain method be applied to analysis of single-member groups. In summary, we propose that group-based BCU-DSA applies the group-based BCU method to multiple-member groups of coherent contingencies group-based BCU-DSA applies the BCU-guided time-domain method to single-member groups of coherent contingencies We present a numerical comparison between BCU-DSA system of [3] and group-based BCU-DSA system (version I) on these two test systems. In particular, we focus on the following issues the issue of classifying stable contingencies as unstable at the fault clearing time (a conservative classification at the fault clearing time)

the issue of classifying unstable contingencies as stable at the fault clearing time (a wrong classification at the fault clearing time)

the issue of over-estimated critical clearing time

Since we propose the use of BCU-guided method, instead of group-based BCU method, to deal with single-member groups of coherent contingencies, we exclude these contingencies in Table 19. The comparison table reveals that Group-based BCU-DSA advances BCU-DSA system on the following

TABLE 19

A numerical comparison between BCU-DSA and group-based BCU-DSA (version I)

| | | | 116-machine test system | 134-machine test system |
|---|---|---|---|---|
| At the Fault-Clearing Time | Classify stable Contingencies As unstable | BCU-DSA System | 2 | 3 |
| | | Group-based BCU-DSA System | 0 | 1 |
| | Classify Unstable Contingencies As stable | BCU-DSA System | 0 | 0 |
| | | Group-based BCU-DSA System | 0 | 0 |
| Over-estimated critical clearing time | | BCU-DSA System | 6 | 0 |
| | | Group-based BCU-DSA System | 0 | 0 |

Improvement in conservative stability classification (i.e. reducing the number of misclassifying stable contingency as unstable)

Elimination of incorrect stability assessment (i.e. no misclassification of unstable contingency as stable)

Elimination of over-estimated critical clearing times (no over-estimation of critical clearing time for each contingency)

We use numerical examples to illustrate the above advances made by group-based BCU-DSA system. For the 116-machine test system, BCU-DSA correctly classifies the stability of 310 contingencies, out of a total of 312 contingencies and conservatively classifies 2 stable contingencies as unstable. On the other hand, group-based BCU-DSA system correctly classifies the stability of 312 contingencies, out of a total of 312 contingencies and makes no conservative classification. In terms of critical clearing time, BCU-DSA system gives slightly conservative estimation of critical clearing times for 306 contingencies, out of a total of 312 contingencies and gives over-estimated critical clearing times for 6 contingencies while group-based BCU-DSA system gives slightly conservative estimation of critical clearing times for 312 contingencies, out of a total of 312 contingencies and gives no over-estimated critical clearing times for any contingency.

We point out that the conservative property in estimating critical clearing time comes with any Controlling UEP-based energy function method as long as the Controlling UEP is used along with an exact energy function.

For the 134-machine test system, BCU-DSA correctly classifies the stability of 132 contingencies, out of a total of 135 contingencies and conservatively classifies 3 stable contingencies as unstable. On the other hand, group-based BCU-DSA system correctly classifies the stability of 134 contingencies, out of a total of 135 contingencies and makes only one conservative classification. In terms of critical clearing time, BCU-DSA system gives slightly conservative estimation of critical clearing times for 135 contingencies, out of a total of 135 contingencies and gives no over-estimated critical clearing time for any contingency while group-based BCU-DSA system gives slightly conservative estimation of critical clearing times for 135 contingencies, out of a total of 135 contingencies and gives no over-estimated critical clearing times for any contingency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

6. REFERENCES

[1] H. D. Chiang, "On-Line Method for determining Power System Transient Stability," U.S. Pat. No. 5,483,462, Jan. 9, 1996.

[2] H. D. Chiang and C. S. Wang, "Method for On-Line Dynamic Contingency Screening of Electric Power Systems", U.S. Pat. No. 5,719,787, Feb. 17, 1998.

[3] H. D. Chiang, A. Kurita, H. Okamoto, R. Tanabe, Y. Tada, K. Koyanagi, and Y. Zhou, "Method and system for on-line dynamical screening of electric power system", U.S. Patent Application Publication, Pub. No. US 2003/0200010 A1, Oct. 23, 2003

[4] H. D. Chiang, F. F. Wu, and P. P. Varaiya, "Foundations of direct methods for power system transient stability analysis", IEEE Trans. on Circuits and Systems, CAS-34(2): pp. 160-173, February 1987.

What is claimed is:

1. A computer implemented method of obtaining controlling unstable equilibrium point (CUEP) satisfying a boundary condition in a BCU system, comprising:

Obtaining computed UEPs and post-fault SEPs of study contingencies in reduced model of original system;

classifying the computed UEPs into UEP groups of coherent contingencies based on a predetermined condition;

selecting one UEP group from the classified UEP groups; selecting both of UEP with the largest SEP separation and UEP with the smallest SEP separation from the selected one UEP group;

calculating BCU-exit points of the selected UEPs based on a predetermined condition; and determining that the computed UEPs of the selected one UEP group are the CUEP satisfying the boundary condition if the selected UEPs equal to the calculated BCU-exit points, respectively.

2. A computer implemented method of obtaining controlling unstable equilibrium point (CUEP) satisfying a boundary condition in a BCU system, comprising:

obtaining a group of coherent contingencies which violates boundary condition;

computing UEP from the obtained group of coherent contingencies which violates boundary condition;

selecting the computed UEP which has the largest SEP separation, say $X_l^{UEP}$ with respect to contingency, say $L_l$, and selecting the computed UEP which has the smallest SEP separation, say $X_s^{UEP}$, with respect to contingency, say $L_s$; and computing corresponding BCU-Exit points for $X_l^{UEP}$ and $X_s^{UEP}$ respectively; where BCU-Exit points for $X_l^{UEP}$ and $X_s^{UEP}$ are denoted as $X_l^{bcu}$ and $X_s^{bcu}$ respectively, thereby using an energy at $X_l^{bcu}$, denoted as $V_l^{bcu}$, as critical energy for the contingency $L_s$ and an energy at $X_s^{bcu}$, denoted as $V_s^{bcu}$, as the critical energy for the contingency $L_s$, wherein the SEP separation of a contingency, say $L_i$, in the group of coherent contingencies be $SEP_i$ and the critical energy for the contingency $L_i$ is the following equation:

$$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

3. A computer implemented method for group-based BCU method, comprising:

computing controlling unstable equilibrium point (UEP) and post-fault SEP of each study contingency of a contingency list until the contingency list is finished by using BCU method; and classifying the computed UEPs associated with each contingency into groups of coherent contingencies based on predetermined condition, wherein each classified group of UEPs performs the following steps:

selecting UEP with the greatest SEP separation when the SEP separation of each contingency in the group is predetermined amount or less, otherwise selecting UEP with the greatest SEP separation and UEP with the smallest SEP separation;

checking boundary property of the selected UEP or UEPs in accordance with a predetermined method;

determining UEPs of entire group lie on stability boundary of an original system based on the checking result;

performing a direct stability assessment and calculate an energy margin for each study contingency in the group of coherent contingencies based on a critical energy when the determining steps determines that UEPs of entire group lie on stability boundary of the original system, wherein the critical energy value each study contingency in the groups of coherent contingencies is energy value at the computed UEP;

computing corresponding BCU-Exit point for $X_l^{UEP}$ and $X_s^{UEP}$ respectively, wherein the corresponding BCU-Exit point for $X_l^{UEP}$ and $X_s^{UEP}$ are denoted as $X_l^{bcu}$ and $X_s^{bcu}$ respectively, the selected UEP which has the largest SEP separation is denoted as $X_l^{UEP}$ with respect to contingency, say $L_l$, and the selected UEP which has the smallest SEP separation is denoted as $X_s^{UEP}$, with respect to contingency, say $L_s$;

computing critical energy for contingency $L_i$ based on the following equations:

$$V_i^{cr} = a \times SEP_i + b$$

where $$a = \frac{V_l^{bcu} - V_s^{bcu}}{SEP_l - SEP_s}$$

$$b = \frac{V_s^{bcu} \times SEP_l - V_l^{bcu} \times SEP_s}{SEP_l - SEP_s}$$

wherein the energy at $X_l^{bcu}$ is denoted as $V_l^{bcu}$, as the critical energy for the contingency $L_s$ and the energy at $X_s^{bcu}$ is denoted as $V_s^{bcu}$, as the critical energy for the contingency $L_s$; and performing a direct stability assessment and calculate an energy margin for each study contingency in the group of coherent contingencies based on the computed critical energy when the determining steps determines that UEPs of entire group do not lie on stability boundary of the original system.

* * * * *